(12) United States Patent
Honoki et al.

(10) Patent No.: US 12,196,555 B2
(45) Date of Patent: Jan. 14, 2025

(54) TECHNIQUE FOR PROVIDING NOTIFICATION OF RECEIVING POSITION OF LASER BEAM EMITTED FROM LASER MARKER

(71) Applicant: MAKITA CORPORATION, Anjo (JP)

(72) Inventors: Manami Honoki, Anjo (JP); Yoichiro Koike, Anjo (JP); Masafumi Noda, Anjo (JP); Yuriko Kawaji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 407 days.

(21) Appl. No.: 17/587,439

(22) Filed: Jan. 28, 2022

(65) Prior Publication Data

US 2022/0244050 A1    Aug. 4, 2022

(30) Foreign Application Priority Data

Feb. 1, 2021    (JP) ................................. 2021-014551

(51) Int. Cl.
*G01C 15/00*    (2006.01)
*G08C 17/02*    (2006.01)

(52) U.S. Cl.
CPC .......... *G01C 15/006* (2013.01); *G08C 17/02* (2013.01); *G08C 2200/00* (2013.01)

(58) Field of Classification Search
CPC .... G01C 15/006; G01C 15/002; G08C 17/00; G08C 2200/00; G01S 7/484; G01S 17/88; G01S 7/51; G01S 7/003; G01S 13/865; G01S 5/0284; G01S 7/4911; G01S 5/0027; G01S 13/89
See application file for complete search history.

(56) References Cited

U.S. PATENT DOCUMENTS

2013/0298413 A1* 11/2013 Kehl ...................... G01C 15/00
33/286
2014/0283399 A1* 9/2014 Fessler ................. G01C 15/008
33/291
2018/0203120 A1* 7/2018 Nagalla ................... G01S 7/003
2019/0072656 A1* 3/2019 Giesen .................... G01S 17/08

FOREIGN PATENT DOCUMENTS

JP         6628633 B2    1/2020
KR    20180076969 A   *  7/2018

* cited by examiner

*Primary Examiner* — Eman A Alkafawi
*Assistant Examiner* — Dilara Sultana
(74) *Attorney, Agent, or Firm* — Oliff PLC

(57) ABSTRACT

A display control method in one aspect of the present disclosure includes: displaying a position image; acquiring a relevant signal; and rotating the position image. Displaying a position image includes displaying a position image in a specified direction with respect to a background image of a screen of a portable terminal device. Rotating the position image includes rotating the position image with respect to the background image so that an image direction matches a device direction.

10 Claims, 13 Drawing Sheets

TECHNIQUE FOR PROVIDING NOTIFICATION OF RECEIVING POSITION OF LASER BEAM EMITTED FROM LASER MARKER

CROSS-REFERENCE TO RELATED APPLICATIONS

This application claims the benefit of Japanese Patent Application No. 2021-14551 filed on Feb. 1, 2021 with the Japan Patent Office, the entire disclosure of which is incorporated herein by reference.

BACKGROUND

The present disclosure relates to a notification of a receiving position of a laser beam emitted from a laser marker.

Japanese Patent No. 6628633 discloses a laser marker configured to be used with a remote controller. The remote controller includes a beam receiver, and is placed away from the laser marker. The beam receiver receives a laser beam emitted from the laser marker. The remote controller includes a light emitting diode (LED) and a buzzer, and notifies a user of a receiving position of the laser beam in the beam receiver by means of LED lighting and buzzing sound. The user adjusts a position of the laser beam based on the notified receiving position.

SUMMARY

In a case in which the user adjusts the position of the laser beam at a location away from the remote controller, it may be difficult for the user to perceive the LED lighting and the buzzing sound. Thus, it is conceived to display a position image showing the receiving position of the laser beam on a portable terminal device at hand of the user. However, depending on a direction in which the position image is displayed, the user may not be able to intuitively adjust the position of the laser beam at a look at the position image.

One aspect of the present disclosure is to provide a technique that allows a user to easily adjust a receiving position of a laser beam with a portable terminal device.

A display control method of one aspect of the present disclosure includes: displaying a position image in a specified direction with respect to a background image of a screen of a portable terminal device; acquiring a relevant signal (or related signal) relating to a direction of the position image in response to an input of the relevant signal; and rotating the position image with respect to the background image so that an image direction matches a device direction in response to acquisition of the relevant signal. The position image corresponds to a beam receiving position of a laser beam in a beam receiver of a beam receiving device. The beam receiver is configured to receive the laser beam emitted from a laser marker (or a laser level). The beam receiving position corresponds to one of a first position, a second position, and a center position. The center position is located between the first position and the second position. The position image indicates the beam receiving position relative to the first position, the second position, and the center position. The image direction corresponds to a direction from the first position to the second position in the position image. The device direction corresponds to a direction from the first position to the second position in the beam receiver.

Execution of the above-described display control method causes the portable terminal device to display the position image in the specified direction with respect to the background image of the screen, and rotate the position image with respect to the background image so that the image direction matches the device direction when the relevant signal is acquired. Thus, in a case in which the beam receiving position of the laser beam is changed, a moving direction of the beam receiving position on the position image matches a moving direction of the beam receiving position in the beam receiver. Accordingly, since a user can be aware of the moving direction of the beam receiving position in the beam receiver by looking at the screen of the portable terminal device, the user can easily adjust the beam receiving position of the laser beam using the portable terminal device.

The above-described method may further include displaying an image button for rotating the position image on the screen. The relevant signal may correspond to an operation signal indicating a user's manipulation on the image button.

The user, when determining that the moving direction of the beam receiving position on the position image differs from the moving direction of the beam receiving position in the beam receiver, can manipulate the image button on the screen to match the image direction to the device direction.

The above-described method may further include receiving a direction signal via a communicator of the portable terminal device. The direction signal may include a first signal and a second signal. The first signal may indicate the device direction that is different from the image direction. The second signal may indicate the device direction that is the same as the image direction. The relevant signal may correspond to the first signal.

The portable terminal device can determine whether the image direction matches the device direction by receiving the direction signal. Further, the portable terminal device can automatically rotate the position image to match the image direction to the device direction without the user's manipulation, in a case in which the image direction differs from the device direction.

The above-described method may further include: receiving sensor information via a communicator of the portable terminal device, the sensor information indicating whether the beam receiving device includes a device direction sensor configured to detect the device direction; displaying an image button for rotating the position image on the screen in response to the received sensor information indicating that the beam receiving device does not include the device direction sensor; and receiving a direction signal via the communicator in response to the received sensor information indicating that the beam receiving device includes the device direction sensor. The relevant signal corresponds to an operation signal that indicates a user's manipulation on the image button. The direction signal includes a first signal and a second signal. The first signal indicates the device direction that is different from the image direction. The second signal indicates the device direction that is the same as the image direction. The relevant signal corresponds to the first signal.

The portable terminal device can determine whether the beam receiving device includes the device direction sensor by receiving the sensor information. The portable terminal device, when determining that the beam receiving device does not include the device direction sensor, displays an image button on the screen. This allows the user to match the image direction to the device direction based on a determination of the user. On the other hand, the portable terminal device, when determining that the beam receiving device includes the device direction sensor, can automatically match the image direction to the device direction based on the direction signal without the user's manipulation.

The laser marker may acquire information relating to the image direction and the device direction, and determine whether the image direction differs from the device direction. The above-described method may further include: transmitting the image direction to the laser marker via a communicator of the portable terminal device; receiving a determination result on whether the image direction differs from the device direction from the laser marker via the communicator; and providing an alarm in response to the received determination result indicating that the image direction differs from the device direction.

Since the portable terminal device provides an alarm, the user can be aware that the image direction differs from the device direction. Further, the user can manipulate the image button to match the image direction to the device direction.

A laser marker (or a laser level) in another aspect of the present disclosure includes a support body, a rotation body, a motor, a laser beam emitter, a device communicator, a first device reception circuit, a second device reception circuit, a prediction circuit, a determination circuit, and a first device transmission circuit. The rotation body is mounted on top of the support body and is rotatable with respect to the support body. The motor is configured to rotate the rotation body in a first direction or a second direction. The first direction is a direction from a first position to a second position, and the second direction is a direction from the second position to the first position. The laser beam emitter is provided to the rotation body and is configured to emit a laser beam. The device communicator is configured to perform a first wireless communication with a beam receiving device, and perform a second wireless communication with a portable terminal device. The beam receiving device includes a beam receiver. The beam receiver receives the laser beam emitted from the laser marker. A beam receiving position of the laser beam in the beam receiver corresponds to one of the first position, the second position, and a center position. The center position is located between the first position and the second position. The portable terminal device includes a screen, a terminal communicator, and a terminal control circuit. The terminal control circuit is configured to display a position image in a specified direction with respect to a background image of the screen, and rotate the position image so that an image direction matches a device direction. The position image indicates the beam receiving position relative to the first position, the second position, and the center position. The image direction corresponds to a direction from the first position to the second position in the position image. The device direction corresponds to a direction from the first position to the second position in the beam receiver. The first device reception circuit is configured to repeatedly receive the beam receiving position in the beam receiver from the beam receiving device by the first wireless communication via the device communicator. The beam receiving position in the beam receiver changes as the rotation body rotates. The second device reception circuit is configured to receive the image direction from the portable terminal device by the second wireless communication via the device communicator. The prediction circuit is configured to predict a first transition of the beam receiving position on the position image based on the image direction received by the second device reception circuit. The beam receiving position on the position image changes as the rotation body rotates. The determination circuit is configured to determine that the image direction differs from the device direction in response to the first transition predicted by the prediction circuit differs from a second transition. The second transition is based on the beam receiving position repeatedly received by the first device reception circuit. The first device transmission circuit is configured to transmit a determination result by the determination circuit to the portable terminal device by the second wireless communication via the device communicator.

The laser marker may predict the first transition based on the image direction received from the portable terminal device. When the image direction matches the device direction, the first transition in the position image matches the second transition in the beam receiver. Thus, the laser marker can determine that the image direction differs from the device direction in response to the first transition differing from the second transition.

The laser marker may further include a third device reception circuit and a motor driving circuit. The third device reception circuit is configured to receive a rotation command from the portable terminal device by the second wireless communication via the device communicator. The rotation command may command rotation of the rotation body in the first direction or the second direction. The motor driving circuit may drive the motor based on the rotation command received by the third device reception circuit. The prediction circuit may predict the first transition based on (i) the image direction received from the second device reception circuit and (ii) the rotation command received by the third device reception circuit.

The laser marker can predict the first transition based on (i) the image direction and (ii) the rotation command received from the portable terminal device.

The laser marker may further include a rotation direction sensor. The rotation direction sensor may detect a rotation direction of the rotation body. The prediction circuit may predict the first transition based on (i) the image direction received by the second device reception circuit and (ii) the rotation direction detected by the rotation direction sensor.

Since the laser marker includes the rotation direction sensor, the laser marker can detect the actual rotation direction of the rotation body. Further, the laser marker can predict the first transition based on (i) the received image direction and (ii) the detected rotation direction. Specifically, the laser marker can predict the first transition, even if the user manipulates a fine adjustment knob provided to the laser marker and adjusts the beam receiving position of the laser beam.

A laser marker in yet another aspect of the present disclosure includes a support body, a rotation body, a motor, a laser beam emitter, a device communicator, a device reception circuit, and a device transmission circuit. The rotation body is mounted on top of the support body and is rotatable with respect to the support body. The motor is configured to rotate the rotation body in a first direction or a second direction. The first direction is a direction from a first position to a second position, and the second direction is a direction from the second position to the first position. The laser beam emitter is provided to the rotation body and is configured to emit a laser beam. The device communicator is configured to perform a first wireless communication with a beam receiving device, and perform a second wireless communication with a portable terminal device. The beam receiving device includes a beam receiver. The beam receiver receives the laser beam emitted from the laser marker. A beam receiving position of the laser beam in the beam receiver corresponds to one of the first position, the second position, and a center position. The center position is located between the first position and the second position.

The portable terminal device includes a screen, a terminal communicator, and a terminal control circuit. The terminal control circuit is configured to display a position image in a specified direction with respect to a background image of the screen, and rotate the position image so that an image direction matches a device direction. The position image indicates the beam receiving position relative to the first position, the second position, and the center position. The image direction corresponds to a direction from the first position to the second position in the position image. The device direction corresponds to a direction from the first position to the second position in the beam receiver. The device reception circuit receives a direction signal from the beam receiving device by a first wireless communication via the device communicator. The direction signal includes a first signal or a second signal. The first signal indicates a device direction that is different from the image direction. The second signal indicates a direction that is the same as the image direction. The device transmission circuit transmits the direction signal received from the device reception circuit to the portable terminal device by the second wireless communication via the device communicator.

The laser marker receives the direction signal from the beam receiving device, and transmits the received direction signal to the portable terminal device. Accordingly, the portable terminal device can receive the direction signal via the laser marker, even if the portable terminal device cannot directly communicate with the beam receiving device. Further, the portable terminal device can automatically rotate the image direction so that the image direction matches the device direction without a user's manipulation, even if the portable terminal device cannot directly communicate with the beam receiving device.

A beam receiving device of yet another aspect of the present disclosure includes a beam receiver, a device direction sensor, a device communicator, and a direction transmission circuit. The beam receiver receives a laser beam emitted from the laser marker. A beam receiving position of the laser beam in the beam receiver corresponds to one of a first position, a second position, and a center position. The center position is located between the first position and the second position. The device direction sensor detects a device direction. The device direction corresponds to a direction from the first position to the second position in the beam receiver. The device communicator performs a first wireless communication with the laser marker. The direction transmission circuit transmits a direction signal to the laser marker by a first wireless communication via the device communicator. The direction signal indicates the device direction detected by the device direction sensor.

The beam receiving device transmits the direction signal that indicates the detected device direction to the laser marker. Thus, the laser marker can acquire the direction signal. Further, the portable terminal device can receive the direction signal via the laser marker. Accordingly, the portable terminal device can automatically rotate the image direction so that the image direction matches the device direction without the user's manipulation.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

<1. Overall Configuration>
<1-1. System>

Figure 1:
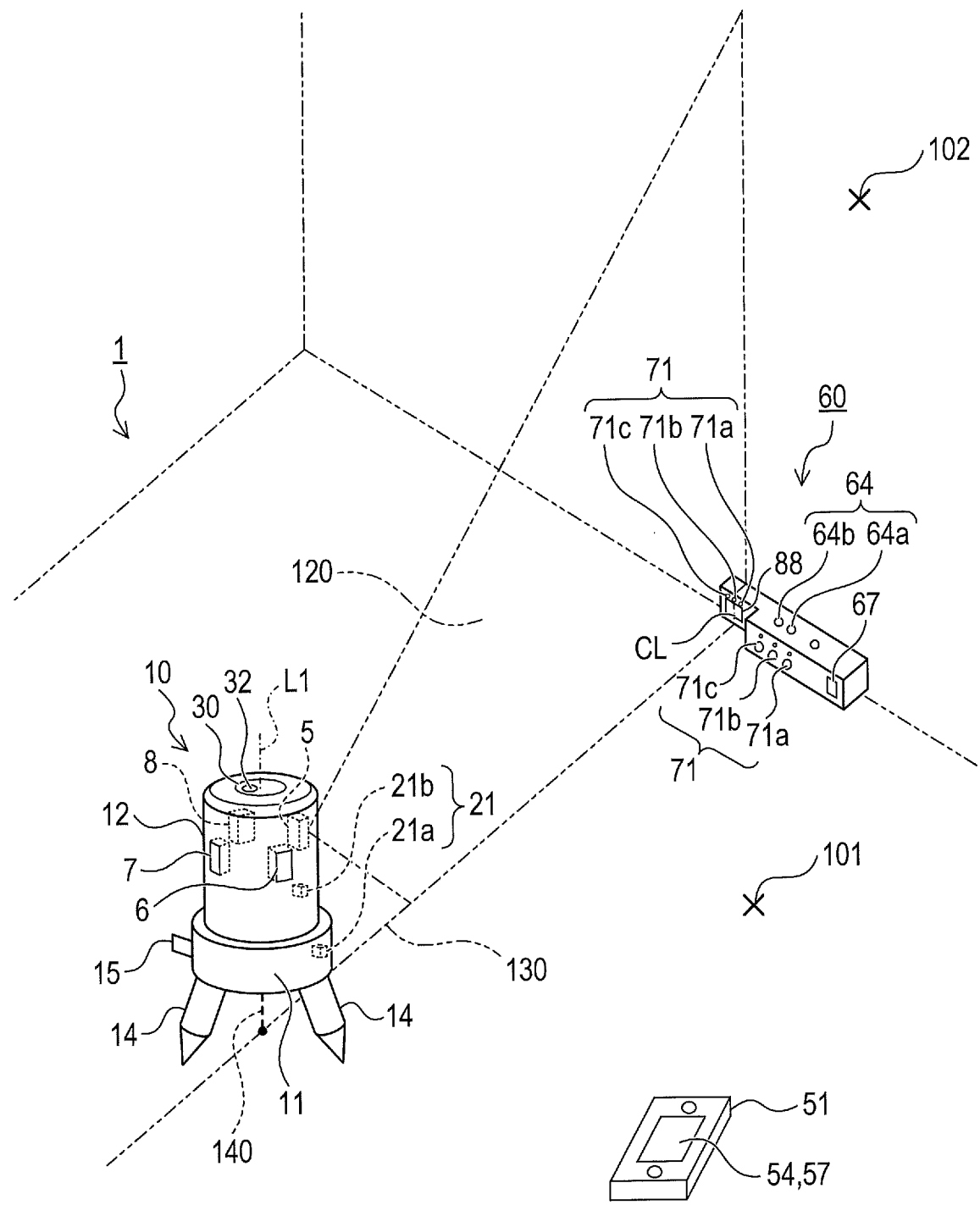
FIG. 1 is a schematic view of a laser marking system according to the present embodiment.

As shown in FIG. 1, a laser marking system (or a laser leveling system) 1 according to the present embodiment includes a laser marker 10, a portable terminal device 51, and a beam receiving device 60. In another embodiment, the portable terminal device 51 or the beam receiving device 60 may be removed from the laser marking system 1.

The laser marker 10 projects a vertical laser beam 120 onto an object. The projected vertical laser beam 120 indicates a reference line. The laser marking system 1 is configured such that the portable terminal device 51 or the beam receiving device 60 controls a rotation of the laser marker 10, specifically a position of the vertical laser beam 120, at a position away from the laser marker 10.

<1-2. Laser Marker>

Figure 2:
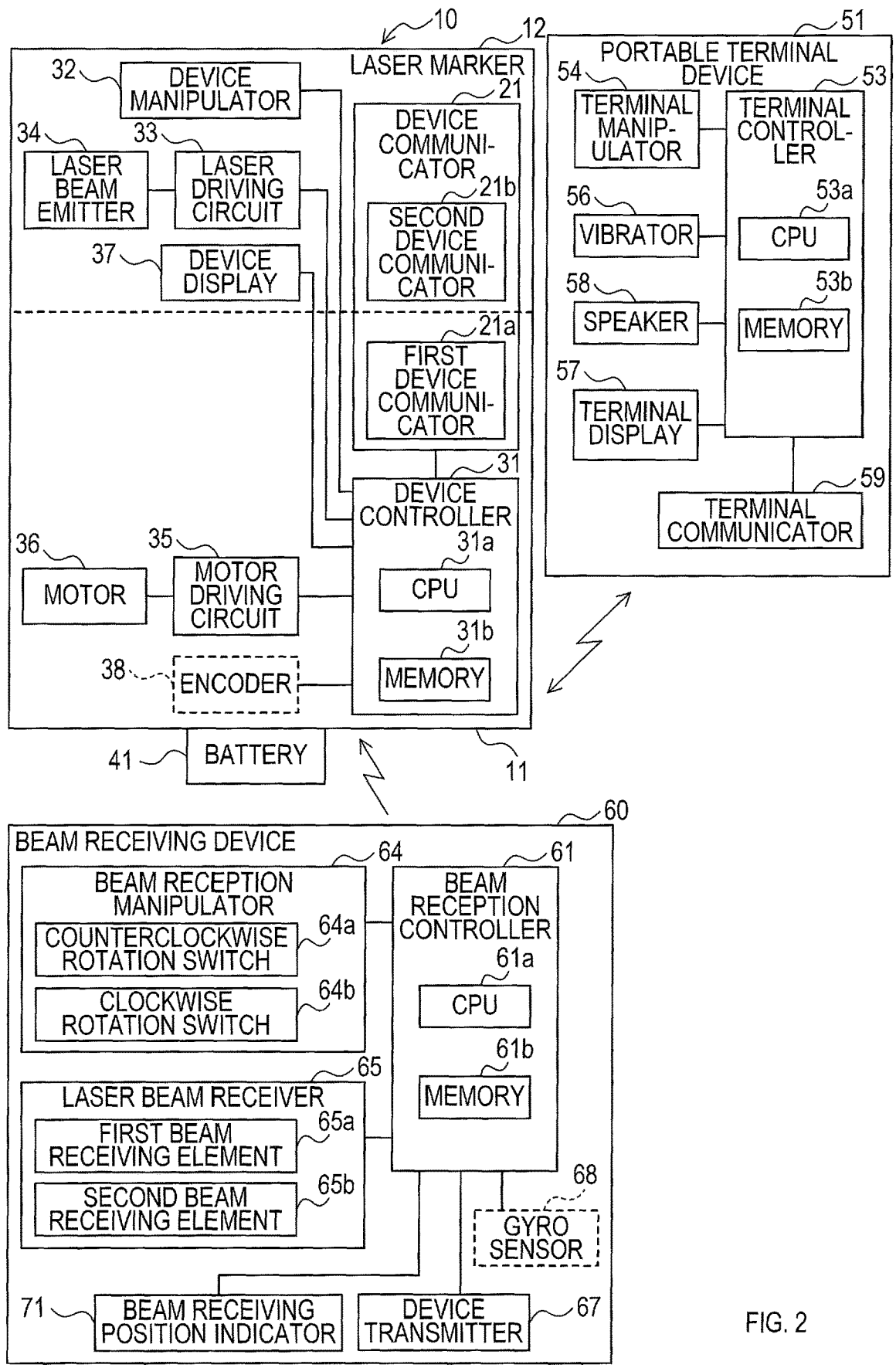
FIG. 2 is a block diagram showing an electrical configuration of the laser marking system.
Figure 3:
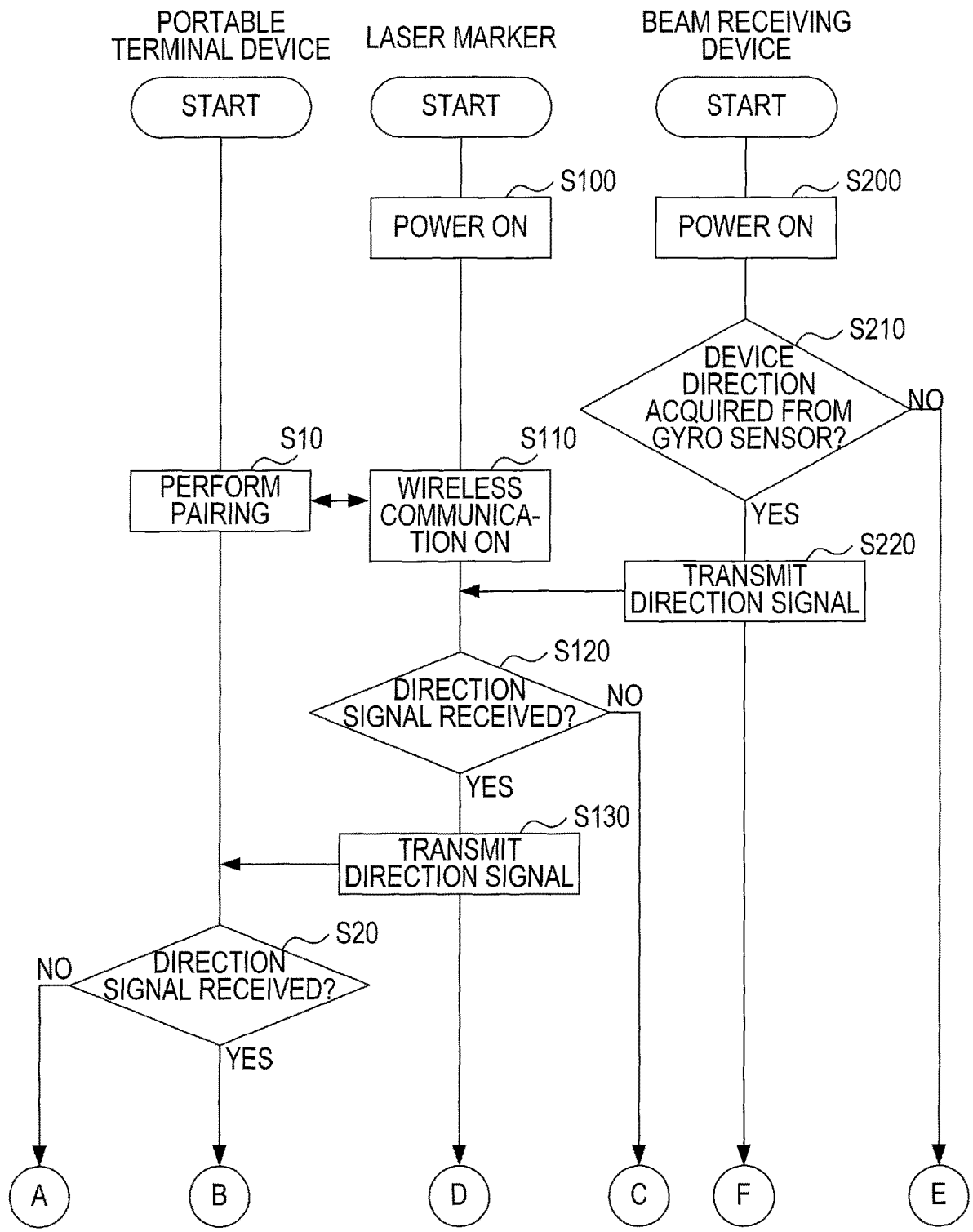
FIG. 3 is a flow chart showing a part of a beam receiving position adjustment process according to the present embodiment.

Referring to FIGS. 1 and 2, a schematic configuration of the laser marker 10 will be described. The laser marker 10 includes a support body 11 and a rotation body 12. The support body 11 includes legs 14 and a fine adjustment knob 15. In the present embodiment, the laser marker 10 includes three legs 14. The support body 11 is supported by the legs 14 on a floor 101. Hereinafter, the floor 101 or a surface other than the floor 101, on which the laser marker 10 is placed, is also referred to as a placement surface. In another embodiment, the support body 11 or the rotation body 12 may be removed from the laser marker 10. In another embodiment, the legs 14 or the fine adjustment knob 15 may be removed from the support body 11.

The rotation body 12 is configured to rotate about a center axis L1 with respect to the support body 11. In FIG. 1, the laser marker 10 is placed such that the center axis L1 is vertical to the placement surface.

The rotation body 12 is formed in a substantially cylindrical shape and extends along the center axis L1. The rotation body 12 includes a first emitter 5, a second emitter 6, a third emitter 7, and a fourth emitter 8. The first to fourth emitters 5 to 8 each emit a laser beam outward of the laser marker 10. The rotation body 12 includes a user interface 30 on its upper surface.

The first to the fourth emitters 5 to 8 are arranged at a specified interval (for example, at a 90° interval) along a circumferential direction of the rotation body 12. The first to fourth emitters 5 to 8 each include a laser beam emitter 34 (see FIG. 2). The laser beam emitter 34 generates the laser beam. The laser beam emitter 34 may include various kinds of laser beam emitting elements. For example, the laser beam emitter 34 may include a semiconductor laser, a gas laser, and/or a solid-state laser. The laser beam emitter 34 may be configured to generate the laser beam with another technique. The laser beam emitter 34 is configured to polarize the laser beam in a vertical direction, to thereby emit the vertical laser beam 120 outward of the laser marker 10. The vertical laser beam 120 indicates a vertical reference line.

The rotation body 12 may include a fifth emitter in addition to the first to fourth emitters 5 to 8. The fifth emitter emits a horizontal laser beam outward of the rotation body 12. The horizontal laser beam indicates a horizontal reference line. The rotation body 12 may include at least one additional emitter, in addition to the fifth emitter, in accordance with a beam divergence of the horizontal laser beam. The at least one additional emitter emits a horizontal laser beam. For example, if each horizontal laser beam has a beam divergence of 110° and the rotation body 12 includes three additional emitters as well as the fifth emitter, the rotation body 12 can emit four horizontal laser beams that overlap with one another in a range of 360° (all around).

In FIG. 1, the vertical laser beam 120 is emitted across a range from the floor 101 to a wall surface 102. The vertical laser beam 120 is emitted from the first emitter 5 of the laser marker 10, which is placed on the floor 101. In FIG. 1, the vertical laser beam 120 is emitted along a ground marker line 130. The laser marker 10 may emit a downward laser beam 140 toward a lower side of the center axis L1 (in other words, a direction toward the placement surface). The ground marker line 130 is provided on the floor 101.

The laser marker 10 includes a device communicator 21. As shown in FIG. 2, the device communicator 21 includes a first device communicator 21a and a second device communicator 21b. The first device communicator 21a performs a wireless communication (hereinafter, referred to as first wireless communication) in accordance with a first communication protocol (or method). The second device communicator 21b performs a wireless communication (hereinafter, referred to as second wireless communication) in accordance with a second communication protocol (or method). The second communication protocol is distinct from the first communication protocol.

The second device communicator 21b transmits and receives various information to and from the portable terminal device 51. The first device communicator 21a receives signals transmitted from the beam receiving device 60. The second communication protocol includes a near field wireless communication protocol (or method). The near field wireless communication protocol is, for example, a protocol that conforms to a standard for Bluetooth (Registered Trademark). The first communication protocol is, for example, a protocol that conforms to a standard for infrared communication. In the present embodiment, the Bluetooth protocol is used as the second communication protocol and the infrared communication protocol is used as the first communication protocol.

The first device communicator 21a receives an infrared light transmitted from the beam receiving device 60 and then photoelectrically converts the infrared light, to thereby extract a first position signal, and a remote controlling signal or an automatic tracking signal, from the infrared light. The first device communicator 21a transmits the extracted first position signal and the extracted remote controlling signal or automatic tracking signal to the support body 11. The first position signal indicates a center position, a first position, or a second position in a later-described laser beam receiving window 88 of the beam receiving device 60. The center position is a position between the first position and the second position. The remote controlling signal commands the laser marker 10 to stop, rotate clockwise, or rotate counterclockwise in response to a user's manipulation on the beam receiving device 60. The rotation body 12 rotates or stops in accordance with the remote controlling signal in a remote controlling mode. The automatic tracking signal commands the laser marker 10 to stop, rotate clockwise, or rotate counterclockwise in accordance with a beam receiving position. The rotation body 12 rotates or stop in accordance with the automatic tracking signal in an automatic tracking mode.

In another embodiment, the first device communicator 21a may be removed from the device communicator 21. In other words, the device communicator 21 may include only the second device communicator 21b. In this case, the first communication protocol conforms to the same communication standard as the second communication protocol and is applied with a modulation that is distinct from a modulation in the first communication protocol. Alternately, in another embodiment, the second device communicator 21b may be removed from the device communicator 21 instead of the first device communicator 21a.

The fine adjustment knob 15 is manually operated by a user for fine adjustment of the beam receiving position of the vertical laser beam 120. The fine adjustment knob 15 is arranged in the support body 11. The user turns the fine adjustment knob 15 in a specified direction when the user wants to move the beam receiving position slightly to the left. This rotates the rotation body 12 to the left, and moves the beam receiving position to the left. The user turns the fine adjustment knob 15 in a direction opposite to the specified direction when the user wants to move the beam receiving position slightly to the right. This rotates the rotation body 12 to the right, and moves the beam receiving position to the right.

<1-3. Portable Terminal Device>

Referring to FIGS. 1 and 2, a schematic configuration of the portable terminal device 51 will be described. The portable terminal device 51 includes a remote control function, which is a function to remotely control the laser marker 10 through a wireless communication, and a remote laser control function. In another embodiment, the remote control function or the remote laser control function may be removed from the portable terminal device 51.

Implementation of the remote control function by the portable terminal device 51 allows the portable terminal device 51 to rotate the laser marker 10 (specifically, rotate the rotation body 12) in response to a user's manipulation. Accordingly, the user can remotely control the laser marker 10 by means of the portable terminal device 51. Implementation of the remote laser control function by the portable terminal device 51 allows the portable terminal device 51 to control the first, second, third, and fourth emitters 5, 6, 7, 8 of the laser marker 10.

The portable terminal device 51 includes a terminal communicator 59. The terminal communicator 59 performs the second wireless communication with the second device communicator 21*b* of the laser marker 10, to thereby transmit and receive various information to and from the second device communicator 21*b*. The terminal communicator 59 transmits, for example, a remote controlling signal in the remote controlling mode. Also, the terminal communicator 59 receives, for example, a device information signal. The device information signal is a signal indicating information on the laser marker 10, and includes a second position signal. The second position signal is a signal obtained by converting the first position signal to conform to the second wireless communication protocol. The first position signal conforms to the first wireless communication protocol, and is transmitted from the beam receiving device 60 to the laser marker 10.

<1-4. Beam Receiving Device>

Referring to FIGS. 1 and 2, a schematic configuration of the beam receiving device 60 will be described. The beam receiving device 60 includes a remote control function, an automatic tracking function, and a remote laser control function. Implementation of the automatic tracking function by the beam receiving device 60 allows the beam receiving device 60 to generate the automatic tracking signal for rotating the rotation body 12 so as to match the beam receiving position to the center position, and transmit the automatic tracking signal to the laser marker 10. In another embodiment, at least one of the remote control function, the automatic tracking function, and the remote laser control function may be removed from the beam receiving device 60.

The beam receiving device 60 includes a device transmitter 67 and the laser beam receiving window 88. The device transmitter 67 performs the first wireless communication with the first device communicator 21*a* of the laser marker 10, to thereby transmit the first position signal, the remote controlling signal, a rotation command signal and the like to the first device communicator 21*a*. In another embodiment, the device transmitter 67 or the laser beam receiving window 88 may be removed from the beam receiving device 60.

The laser beam receiving window 88 has a rectangular shape. The laser beam receiving window 88 is configured to allow the vertical laser beam 120 from the laser marker 10 to enter the beam receiving device 60. When the vertical laser beam 120 enters the laser beam receiving window 88, the laser beam receiver 65 receives the vertical laser beam 120.

The laser beam receiver 65 is arranged inside the beam receiving device 60. The laser beam receiver 65 is formed into a rectangular shape, and includes a first beam receiving element 65*a* and a second beam receiving element 65*b*. The first beam receiving element 65*a* and the second beam receiving element 65*b* may be of the same kind, such as a light receiving diode. The first beam receiving element 65*a* is arranged on a first side of a center line CL. The second beam receiving element 65*b* is arranged on a second side of the center line CL. The center line CL corresponds to a center line of the laser beam receiving window 88 and the laser beam receiver 65 in a horizontal direction. The first beam receiving element 65*a* and the second beam receiving element 65*b* are in contact with each other on the center line CL.

The beam receiving device 60 is placed on the placement surface such that the center line CL is aligned with the ground marker line 130. When a first light receiving amount is greater than a second light receiving amount in the beam receiving device 60, the vertical laser beam 120 deviates from the center to the first side. The first light receiving amount corresponds to an amount of light received by the first beam receiving element 65*a*. The second light receiving amount corresponds to an amount of light received by the second beam receiving element 65*b*. When the first light receiving amount and the second light receiving amount are equal to each other, the vertical laser beam 120 is located at the center. In other words, the vertical laser beam 120 is aligned with the ground marker line 130. When the first light receiving amount is less than the second light receiving amount, the vertical laser beam 120 deviates from the center to the second side.

The first position signal indicates a beam receiving position of the vertical laser beam 120 in the laser beam receiving window 88. When the vertical laser beam 120 is located at the center, the first position signal indicates the center position. When the vertical laser beam 120 is located closer to the first side than the center position, the first position signal indicates the first position. When the vertical laser beam 120 is located closer to the second side than the center position, the first position signal indicates the second position.

<2. Electrical Configuration>

<2-1. Laser Marker>

Referring to FIG. 2, an electrical configuration of the laser marking system 1 will be described.

The laser marker 10 includes a device controller 31, a device manipulator 32, a laser driving circuit 33, the laser beam emitter 34, a motor driving circuit 35, a motor 36, a device display 37, the device communicator 21, and a battery 41. In another embodiment, at least one of the device controller 31, the device manipulator 32, the laser driving circuit 33, the laser beam emitter 34, the motor driving circuit 35, the motor 36, the device display 37, the device communicator 21, and the battery 41 may be removed from the laser marker 10. The device manipulator 32 and the device display 37 are provided to the user interface 30.

The device controller 31 includes a CPU 31*a*, a memory 31*b*, an input/output (I/O) port, and the like. The device controller 31 may be, for example, in the form of a microcomputer. The device controller 31 achieves functions in response to the CPU 31*a* executing various programs stored in the memory 31*b*.

The device manipulator 32 includes a line selection manipulator, an intensity selection manipulator, and a wireless communication manipulator. In another embodiment, at least one of the line selection manipulator, the intensity selection manipulator, and the wireless communication manipulator may be removed from the device manipulator 32.

The laser marker 10 includes first to third lighting modes. The line selection manipulator is a switch to select one of the lighting modes of the laser marker 10. In the first lighting mode, only the first emitter 5 may be turned on. In the second lighting mode, the second emitter 6 and the fourth emitter 8 may be turned on. In the third lighting mode, all the emitters from the first to fourth emitters 5 to 8 may be turned on. In another embodiment, at least one additional lighting mode may be provided. Furthermore, at least one of the first to third lighting modes may be removed. The first to fourth emitters 5 to 8 may be turned on in any manner. The laser marker 10 switches the lighting modes in a specified order every time the line selection manipulator is manipulated.

The laser marker 10 includes four kinds of intensity modes. The four kinds of intensity modes have different brightness of the laser beam emitted from the laser marker 10. The intensity selection manipulator is a switch to select one of the intensity modes. The four kinds of intensity modes include, for example, an eco-mode, a normal mode, a high intensity mode, and an extra high intensity mode.

The wireless communication manipulator is a switch to connect the laser marker 10 to the portable terminal device 51 by the second wireless communication. The wireless communication manipulator is provided to the user interface 30. The second device communicator 21b is configured to establish a communication path for the second wireless communication between the laser marker 10 and the portable terminal device 51 which exists within a wireless communication area, when the wireless communication manipulator is manipulated. The wireless communication area corresponds to a wirelessly-communicable area for the second device communicator 21b.

The laser driving circuit 33 causes the laser beam emitter 34 to emit the laser beam by a pulse drive. The pulse drive allows the vertical laser beam 120 to be emitted in an intermittent manner, not in a continuous manner. The laser driving circuit 33 causes the laser beam emitter 34 to emit the laser beam in a constant cycle at a specified duty ratio. A cycle of the pulse drive may be appropriately determined. In the present embodiment, the cycle of the pulse drive is set to an extent (for example, 0.2 msec or less) that an after-image effect allows the user to visually identify the vertical laser beam 120 as being continuously emitted.

The motor driving circuit 35 drives the motor 36. The motor driving circuit 35 controls a driving current flowing through the motor 36 based on a drive signal outputted from the device controller 31. The motor driving circuit 35 may be in the form of an H-bridge circuit in one example.

The motor 36 may be, for example, in the form of a DC brushed motor. The motor 36 generates a driving force to rotate the rotation body 12 of the laser marker 10. The laser marker 10 may include an additional motor to generate an additional driving force, in addition to the driving force required for a rotational motion of the rotation body 12. The motor 36 may be in the form of a three-phase brushless motor or a stepper motor.

The device display 37 shows a state of the laser marker 10. The device display 37 includes an intensity display, a wireless communication display, and a battery state display. The intensity display shows an intensity state of the vertical laser beam 120. The wireless communication display shows a wireless communication state between the laser marker 10 and the portable terminal device 51. The battery state display shows a remaining energy of the battery 41. In another embodiment, at least one of the intensity display, the wireless communication display, and the battery state display may be removed from the device display 37.

The battery 41 is a power source to supply an electric power to the laser marker 10. The battery 41 is detachably attached to the laser marker 10. The battery 41 includes a rechargeable battery. When the remaining energy of the battery 41 decreases, the battery 41 is replaced with another battery, whereby the laser marker 10 can operate continuously. The battery 41 may include a non-rechargeable battery in addition to or in replacement of the rechargeable battery.

The laser marker 10 may include an encoder 38. The encoder 38 detects a rotation position of the rotation body 12, and outputs an encoder signal indicating the detected rotation position to the device controller 31. The device controller 31 can detect a rotation direction of the rotation body 12 from time series of the encoder signals. The fine adjustment knob 15 mechanically rotates the rotation body 12. Thus, if the laser marker 10 does not include the encoder 38, the device controller 31 cannot determine whether the rotation body 12 is rotating to right or left when the user rotate s the rotation body 12 using the fine adjustment knob 15. If the laser marker 10 includes the encoder 38, the device controller 31 can determine the rotation direction of the rotation body 12 when the user rotates the rotation body 12 using the fine adjustment knob 15. In the present embodiment, the encoder 38 corresponds to one example of a rotation direction sensor of the present disclosure.

<2-2. Portable Terminal Device>

The portable terminal device 51 includes a terminal controller 53, a terminal manipulator 54, a terminal display 57, a vibrator 56, a speaker 58, and the terminal communicator 59. In another embodiment, at least one of the terminal controller 53, the terminal manipulator 54, the terminal display 57, the vibrator 56, the speaker 58, and the terminal communicator 59 may be removed from the portable terminal device 51.

The terminal controller 53 includes a CPU 53a, a memory 53b, an I/O port, and the like. The terminal controller 53 may be, for example, in the form of a microcomputer. The terminal controller 53 achieves functions in response to the CPU 53a executing various programs stored in the memory 53b. In the present embodiment, the terminal controller 53 corresponds to one example of a control circuit of the present disclosure.

The CPU 53a may be configured to execute a program code encoded in a tangible computer readable medium. The computer readable medium refers to any medium that can provide the CPU 53a with data to operate the portable terminal device 51 in a specified method. Various computer readable media may be used to provide the CPU 53a with commands to cause the CPU 53a to execute the commands. A general type of the computer readable medium includes, for example, a magnetic medium, an optical medium, a physical medium, a memory chip or a memory cartridge, a carrier wave, and any other computer readable media. The computer readable medium may be a volatile medium, a non-volatile medium, or a transmission medium. The volatile medium and the non-volatile medium may be embodied by any method or technique to store information (for example, computer readable commands, data structures, program modules, or other data described in details below). The transmission medium may be a coaxial cable, a copper wire, and/or an optical fiber cable, and a sound wave or an electromagnetic wave (including a radio wave and an optical wave). The tangible computer readable storage medium may be, for example, an integrated circuit (for example, a field programmable gate array or an application specific IC), a hard disc, an optical disc, an optical magnetic disc, a floppy disc, a magnetic tape, a holographic memory medium, a solid state device, a RAM, a ROM, an electrically erasable programmable read-only memory (EEPROM), a flash memory or other memory technology, a CD-ROM, a digital versatile disc (DVD) or other optical storages, and a magnetic tape in cassette form, a magnetic tape, a magnetic disc memory or other magnetic storages.

The terminal manipulator 54 includes a touch screen. The touch screen is configured such that the user directly touches the touch screen with a finger or a thumb, to thereby perform an input manipulation. The touch screen transmits a signal to the terminal controller 53 in accordance with the input manipulation by the user.

The terminal display 57 includes a display panel. The display panel provides an image in accordance with a display command signal from the terminal controller 53. The display panel may be, for example, in the form of a liquid crystal panel or an organic electroluminescence (EL) panel.

The terminal manipulator 54 and the terminal display 57 may each include a liquid crystal display (LCD) with a touch screen or an organic EL display with a touch screen.

The vibrator 56 outputs a vibration in accordance with a vibration output command signal from the terminal controller 53. Vibration patterns are preset, and a vibration pattern to be outputted is selected from the vibration patterns in accordance with the vibration output command signal.

The speaker 58 outputs a buzzing sound in accordance with a sound output command signal from the terminal controller 53. Buzzing sound patterns are preset, and a buzzing sound pattern to be outputted is selected from the buzzing sound patterns in accordance with the sound output command signal. The speaker 58 also outputs voice or music in accordance with the sound output command signal from the terminal controller 53.

<2-3. Beam Receiving Device>

The beam receiving device 60 includes a beam reception controller 61, a beam reception manipulator 64, the laser beam receiver 65, the device transmitter 67, and a beam receiving position indicator 71. In another embodiment, at least one of the beam reception controller 61, the beam reception manipulator 64, the laser beam receiver 65, the device transmitter 67, and the beam receiving position indicator 71 may be removed from the beam receiving device 60.

The beam reception controller 61 includes a CPU 61a, a memory 61b, an I/O port, and the like. The beam reception controller 61 may be, for example, in the form of a microcomputer. The beam reception controller 61 achieves functions in response to the CPU 61a executing various programs stored in the memory 61b.

The beam reception manipulator 64 includes a counterclockwise rotation switch 64a and a clockwise rotation switch 64b. The beam reception manipulator 64 is manually operated by the user in the remote controlling mode. In another embodiment, the counterclockwise rotation switch 64a or the clockwise rotation switch 64b may be removed from the beam reception manipulator 64. The counterclockwise rotation switch 64a is a switch to rotate the rotation body 12 of the laser marker 10 counterclockwise. The clockwise rotation switch 64b is a switch to rotate the rotation body 12 of the laser marker 10 clockwise. In other words, if the laser marking system 1 does not include the portable terminal device 51, the user can change the beam receiving position of the vertical laser beam 120 by manually operating the beam reception manipulator 64 near a position where the beam receiving device 60 is placed In response to receipt of the laser beam, the laser beam receiver 65 transmits a beam reception signal to the beam reception controller 61. Specifically, the laser beam receiver 65 transmits the beam reception signal to the beam reception controller 61 when the vertical laser beam 120 enters the laser beam receiving window 88.

The beam reception controller 61 transmits the first position signal to the laser marker 10 via the device transmitter 67. Also, the beam reception controller 61, in the automatic tracking mode, generates the automatic tracking signal to match the beam receiving position to the center position, and transmits the generated automatic tracking signal to the laser marker 10 via the device transmitter 67.

The beam receiving position indicator 71 includes a first position indicator 71a, a center position indicator 71b, and a second position indicator 71c. The beam receiving position indicator 71 provides a notification of the beam receiving position of the vertical laser beam 120. In another embodiment, at least one of the first position indicator 71a, the center position indicator 71b, and the second position indicator 71c may be removed from the beam receiving position indicator 71. In FIG. 1, the first position indicator 71a, the center position indicator 71b, and the second position indicator 71c are horizontally aligned with each other in this order from the right side as viewed from the laser marker 10. The first position indicator 71a includes an LED and lights on in orange when the beam receiving position is the first position, and lights off when the beam receiving position is the center position or the second position. The center position indicator 71b includes an LED and lights on in green when the beam receiving position is the center position, and light off when the beam receiving position is the first position or the second position. The second position indicator 71c lights on in red when the beam receiving position is the second position, and lights off when the beam receiving position is the first position or the center position.

The beam receiving device 60 may include a gyro sensor 68. The gyro sensor 68 detects a direction of the beam receiving device 60 (hereinafter, referred to as device direction), and transmits a direction signal indicating the detected device direction to the beam reception controller 61. The device direction is a direction from a display position of the first position to a display position of the second position in the laser beam receiver 65 as viewed by the user. Specifically, the device direction is a direction from the first position indicator 71a to the second position indicator 71c as viewed by the user. In FIG. 1, the device direction is a direction from right to left as viewed by the user. In FIG. 1, if the beam receiving device 60 is placed upside down, the device direction is changed to a direction from left to right as viewed by the user. The beam reception controller 61 transmits a first direction signal indicating the device direction to the laser marker 10 via the device transmitter 67. In the present embodiment, the gyro sensor 68 corresponds to one example of a device direction sensor.

<3. Process>

Referring to flow charts of FIGS. 3 to 7, a beam receiving position adjustment process performed by the laser marking system 1 will be described.

Firstly, in S100, the user turns on a power source of the laser marker 10, whereby the laser marker 10 is started.

In S110, the user presses the wireless communication manipulator of the laser marker 10 to turn on wireless communication, whereby the laser marker 10 starts the second wireless communication with the portable terminal device 51.

Simultaneously, in S10, the terminal controller 53 performs pairing with the laser marker 10 in the second wireless communication, and establishes the second wireless communication.

In S200, the user turns on the power source of the beam receiving device 60, whereby the beam receiving device 60 is started.

In S210, it is determined whether the beam reception controller 61 has acquired the device direction from the gyro sensor 68. If the beam receiving device 60 includes the gyro sensor 68, and the beam reception controller 61 has acquired the device direction from the gyro sensor 68 (S210: YES), then the process proceeds to S220. If the beam reception controller 61 has not acquired the device direction (S210: NO), then the process proceeds to S230.

In S220, the beam reception controller 61 transmits the first direction signal indicating the device direction to the laser marker 10 via the device transmitter 67, and the process proceeds to S700.

In S120, it is determined whether the device controller 31 has received the first direction signal from the beam receiving device 60 via the first device communicator 21a. If the device controller 31 has received the first direction signal from the beam receiving device 60 (S120: YES), then the process proceeds to S130. In S130, the device controller 31 transmits a second direction signal to the portable terminal device 51 via the second device communicator 21b. The process proceeds to S600. The second direction signal is a signal obtained by converting the first direction signal to conform to the second wireless communication protocol. In the present embodiment, the second direction signal corresponds to one example of sensor information of the present disclosure. If the device controller 31 has not received the first direction signal from the beam receiving device 60 (S120: NO), then the process proceeds to S140.

In S20, it is determined whether the terminal controller 53 has received the second direction signal from the laser marker 10 via the terminal communicator 59. If the terminal controller 53 has received the second direction signal from the laser marker 10 (S20: YES), then the process proceeds to S500. If the terminal controller 53 has not received the second direction signal from the laser marker 10 (S20: NO), then the process proceeds to S30.

<3-1. Manual Adjustment Process of Image Direction>

Figure 4:
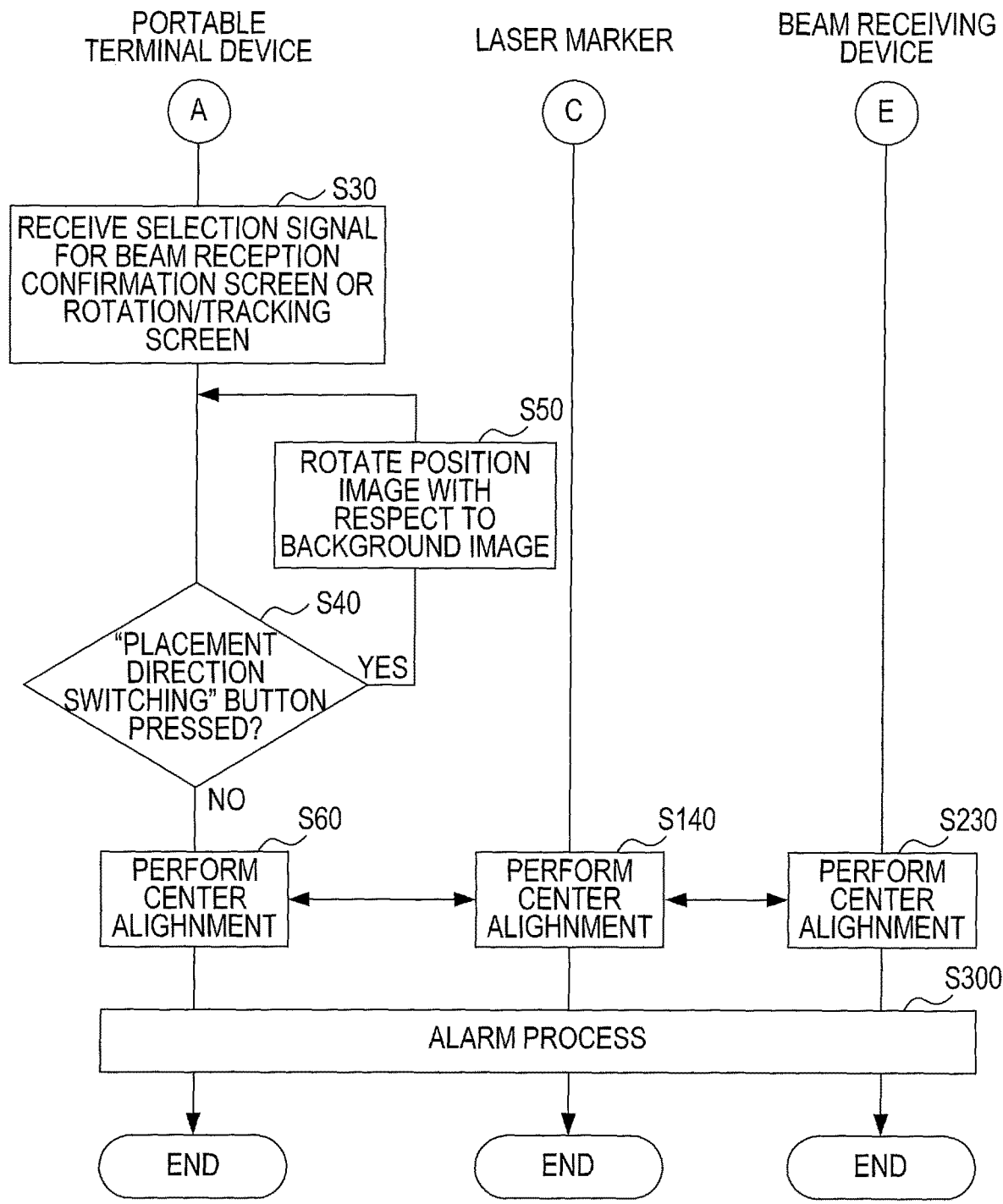
FIG. 4 is a flow chart showing another part of the beam receiving position adjustment process according to the present embodiment.

In S30 to S60 shown in FIG. 4, a manual adjustment process of an image direction is performed when the terminal controller 53 has not received the second direction signal.

Firstly, in S30, the user selects a beam reception confirmation screen or a rotation/tracking screen in a home screen displayed on the terminal display 57, and the terminal controller 53 receives a screen selection signal. When the screen selection signal indicates selection of the rotation/tracking screen, the terminal controller 53 displays the rotation/tracking screen on the terminal display 57. When the screen selection signal indicates selection of the beam reception confirmation screen, the terminal controller 53 displays the beam reception confirmation screen on the terminal display 57.

Figure 8:
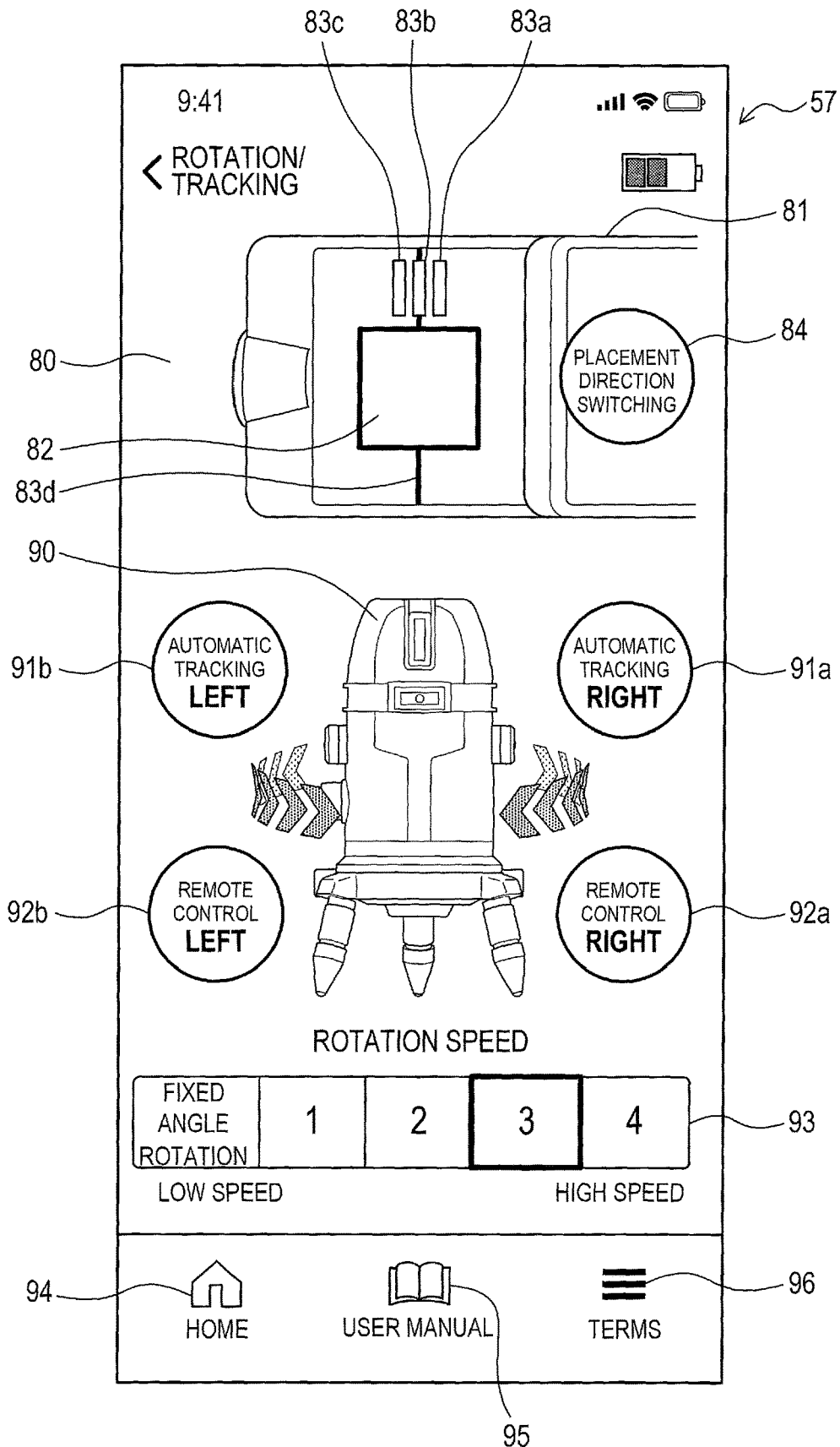
FIG. 8 is a first example of a rotation/tracking screen of a portable terminal device according to the present embodiment.
Figure 9:
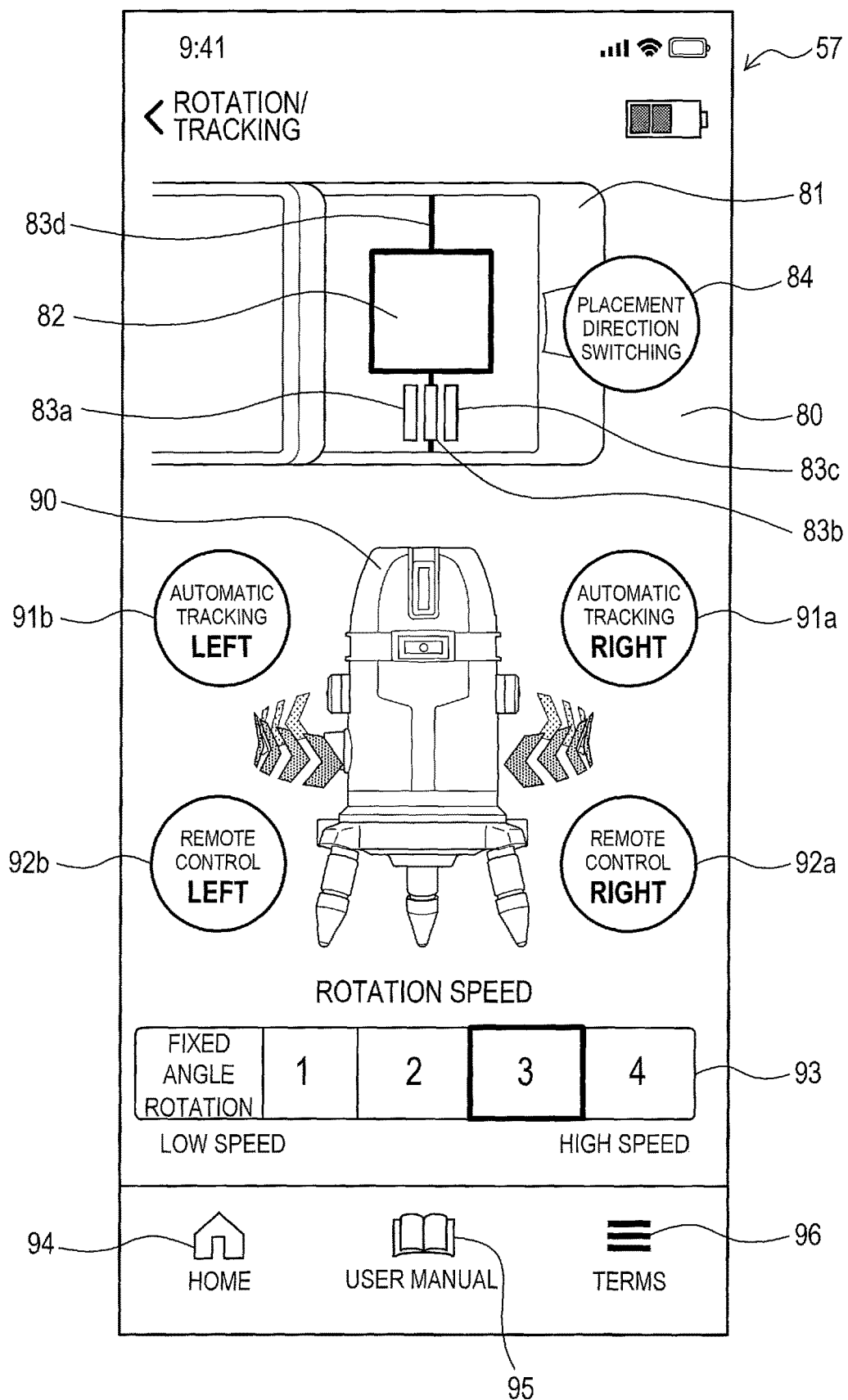
FIG. 9 is a second example of the rotation/tracking screen of the portable terminal device.
Figure 10:
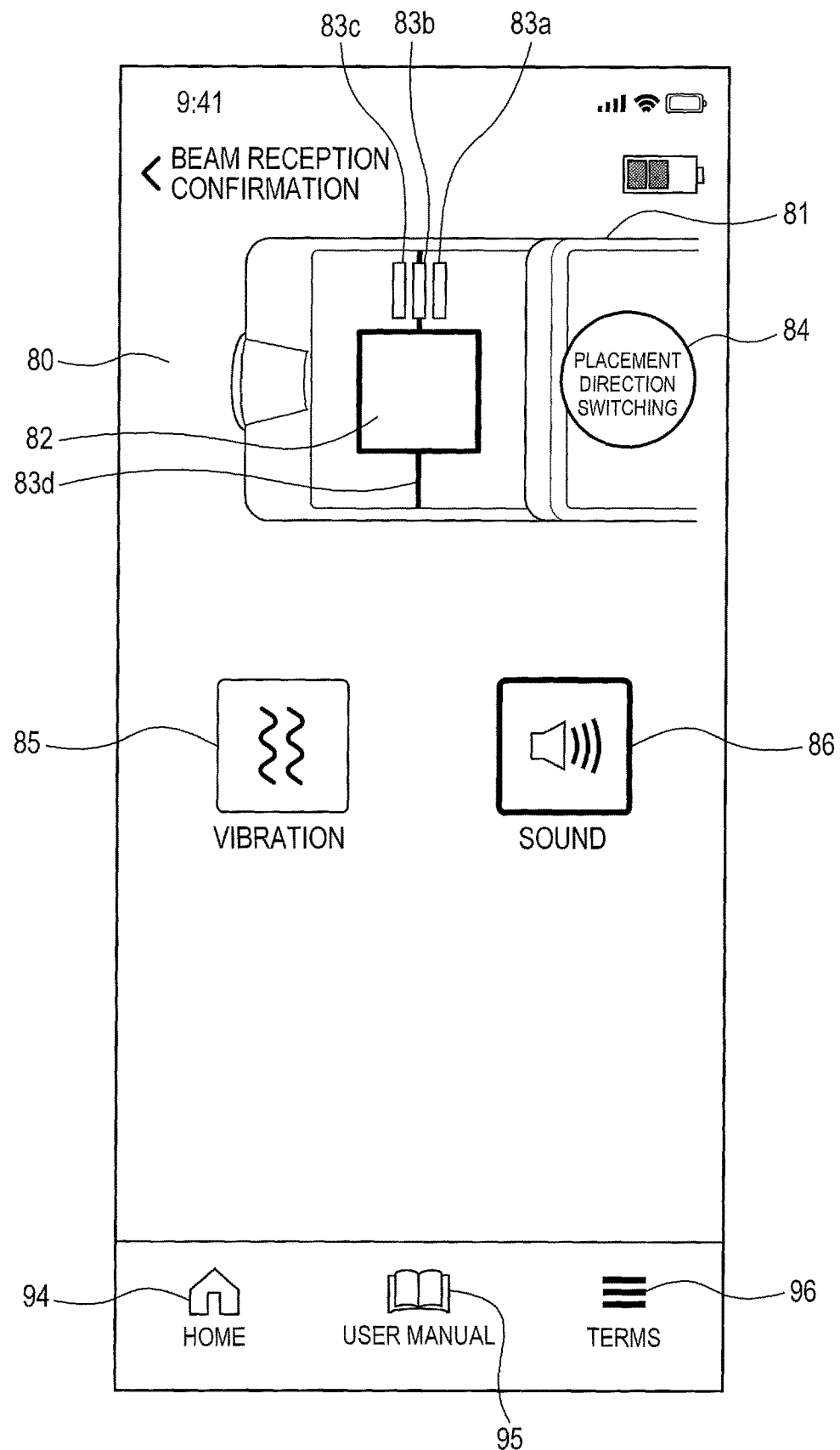
FIG. 10 is a first example of a beam reception confirmation screen of the portable terminal device.

FIGS. 8 and 9 show the rotation/tracking screen. The rotation/tracking screen includes a background image 80, a position image 81, a placement direction switching button 84, a laser marker image 90, a right automatic tracking button 91a, a left automatic tracking button 91b, a right remote control button 92a, a left remote control button 92b, a rotation speed selector 93, a home icon 94, a user manual icon 95, and a terms icon 96. In another embodiment, at least one of the background image 80, the position image 81, the placement direction switching button 84, the laser marker image 90, the right automatic tracking button 91a, the left automatic tracking button 91b, the right remote control button 92a, the left remote control button 92b, the rotation speed selector 93, the home icon 94, the user manual icon 95, and the terms icon 96 may be removed from the rotation/tracking screen.

The background image 80 is displayed on the entire terminal display 57. The position image 81 is displayed on top of the background image 80. The position image 81 shows the beam receiving position relative to three positions of the first position, the center position, and the second position, which corresponds to the beam receiving position of the vertical laser beam 120 in the laser beam receiver 65. In the present embodiment, the position image 81 corresponds to an image of a portion of the laser beam receiving window 88 of the beam receiving device 60. The position image 81 includes a beam receiving window 82, a first positional indicator 83a, a center positional indicator 83b, a second positional indicator 83c, and a center line 83d. Each of the first positional indicator 83a, the center positional indicator 83b, and the second positional indicator 83c has a rectangular frame.

The terminal controller 53, when the position signal received from the laser marker 10 indicates the first position, turns the inside of the frame of the first positional indicator 83a to orange. The terminal controller 53, when the position signal received from the laser marker 10 indicates the center position, turns the inside of the frame of the center positional indicator 83b to green. The terminal controller 53, when the position signal received from the laser marker 10 indicates the second position, turns the inside of the frame of the second positional indicator 83c to red.

As viewed by the user, the image direction is a direction from the first position to the second position in the position image 81. Specifically, as viewed by the user, the image direction is a direction from the first positional indicator 83a to the second positional indicator 83c.

In the initial rotation/tracking screen, the position image 81 is displayed in a specified direction with respect to the background image 80. However, there are cases in which the image direction in the initial screen does not match the device direction. In the initial screen, as shown in FIG. 8, there are cases in which, while the image direction is a direction from right to left, the device direction is shown as a direction from left to right, that is, a direction when the beam receiving device is placed upside down in FIG. 1.

In this case, when the beam receiving position is on the right side of the center line CL in the laser beam receiver 65, the position signal transmitted from the beam receiving device 60 indicates the second position. Therefore, in the position image 81, the second positional indicator 83c is colored. In the initial screen, since the second positional indicator 83c is displayed on the left side of the center line 83d, the user is aware that the beam receiving position is on the left side of the center position. Thus, in the remote controlling mode or in fine adjustment using the fine adjustment knob 15, the user manipulates the portable terminal device 51 or the fine adjustment knob 15 so as to rotate the rotation body 12 from left to right. As a result, the beam receiving position is further away from the center position.

Specifically, when the image direction does not match the device direction, it is difficult for the user to look at the position image 81 and intuitively adjust the beam receiving position of the vertical laser beam 120. Therefore, it is necessary to match the image direction to the device direction. However, when the beam receiving device 60 does not include the gyro sensor 68, the laser marker 10 or the portable terminal device 51 cannot determine the device direction. Further, the laser marker 10 or the portable terminal device 51 cannot determine whether the image direction matches the device direction.

Thus, when the beam receiving device 60 does not include the gyro sensor 68, that is, when the beam receiving device 60 does not transmit the direction signal, the user determines whether the image direction matches the device direction. If the image direction does not match the device direction, then the user manipulates the placement direction switching button 84, and rotates the position image 81 so that the image direction matches the device direction. Specifically, the user matches the image direction to the device direction by manual operation.

The placement direction switching button 84 is displayed on top of the right side portion of the position image 81. When the user presses the placement direction switching button 84, the position image 81 is rotated by 90° or 180° and the rotated position image 81 is displayed. FIG. 9 shows a screen in which the position image 81 shown in FIG. 8 is rotated by 180°. For example, when the laser marker 10 emits only the vertical laser beam 120, the terminal controller 53 rotates the position image 81 by 180° each time the placement direction switching button 84 is pressed. Also, when the laser marker 10 emits the horizontal laser beam, in addition to the vertical laser beam 120, the terminal controller 53 rotates the position image 81 by 90° each time the placement direction switching button 84 is pressed. The user may repeatedly press the placement direction switching button 84 until the image direction matches the device direction.

The laser marker image 90 is displayed on top of the central portion of the background image 80. The right automatic tracking button 91a is displayed on the upper right side of the laser marker image 90. The left automatic tracking button 91b is displayed on the upper left side of the laser marker image 90. The right remote control button 92a is displayed on the lower right side of the laser marker image 90. The left remote control button 92b is displayed on the lower left side of the laser marker image 90.

The right automatic tracking button 91a and the left automatic tracking button 91b are pressed when the user selects the automatic tracking mode. When the user presses the right automatic tracking button 91a or the left automatic tracking button 91b, the beam receiving position of the vertical laser beam 120 is automatically adjusted to the center position. The user may select the right automatic tracking button 91a when the vertical laser beam 120 is displaced to the left side of the center line CL. The user may select the left automatic tracking button 91b when the vertical laser beam 120 is displaced to the right side of the center line CL.

The right remote control button 92a and the left remote control button 92b are pressed when the user selects the remote controlling mode. When the user presses the right remote control button 92a, a first rotation command signal is transmitted to the laser marker 10 via the terminal communicator 59. The first rotation command signal rotates the rotation body 12 from left to right. When the user presses the left remote control button 92b, a second rotation command signal is transmitted to the laser marker 10 via the terminal communicator 59. The second rotation command signal rotates the rotation body 12 from right to left.

The rotation speed selector 93 is displayed on top of the background image 80 below the laser marker image 90. The rotation speed selector 93 includes a first selector and a second selector. The first selector is pressed to select one of four speeds for continuous rotation. The four speeds include a first speed, a second speed, a third speed, and a fourth speed. The second selector is pressed to select one speed for fixed angle rotation (or constant angle rotation).

The home icon 94, the user manual icon 95, and the terms icon 96 are displayed below the background image 80. The home icon 94 is pressed to display the home screen on the terminal display 57. The user manual icon 95 is pressed to display a user manual of the laser marking system 1 on the terminal display 57. The terms icon 96 is pressed to display application terms on the terminal display 57.

Figure 11:
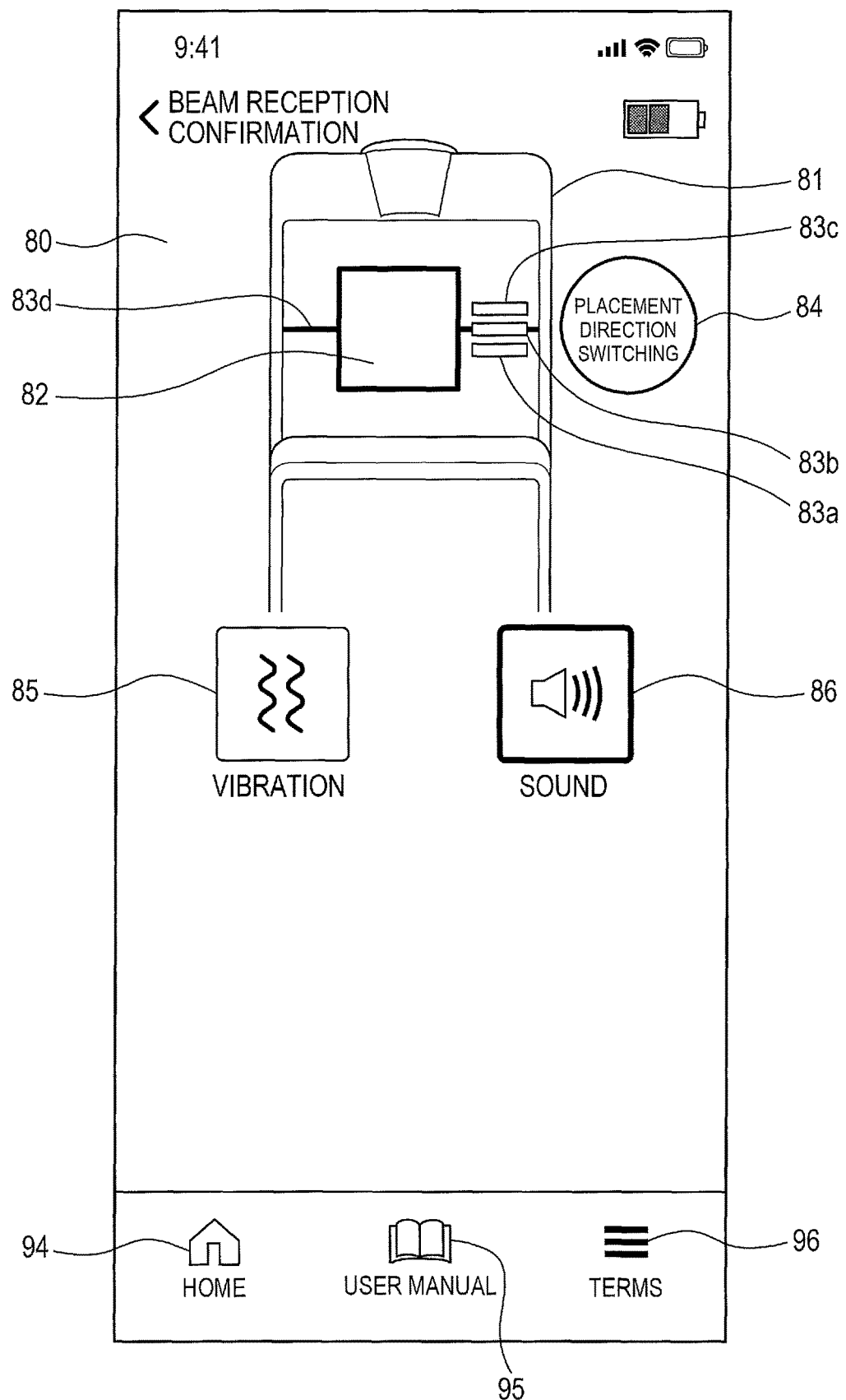
FIG. 11 is a second example of the beam reception confirmation screen of the portable terminal device.
Figure 12:
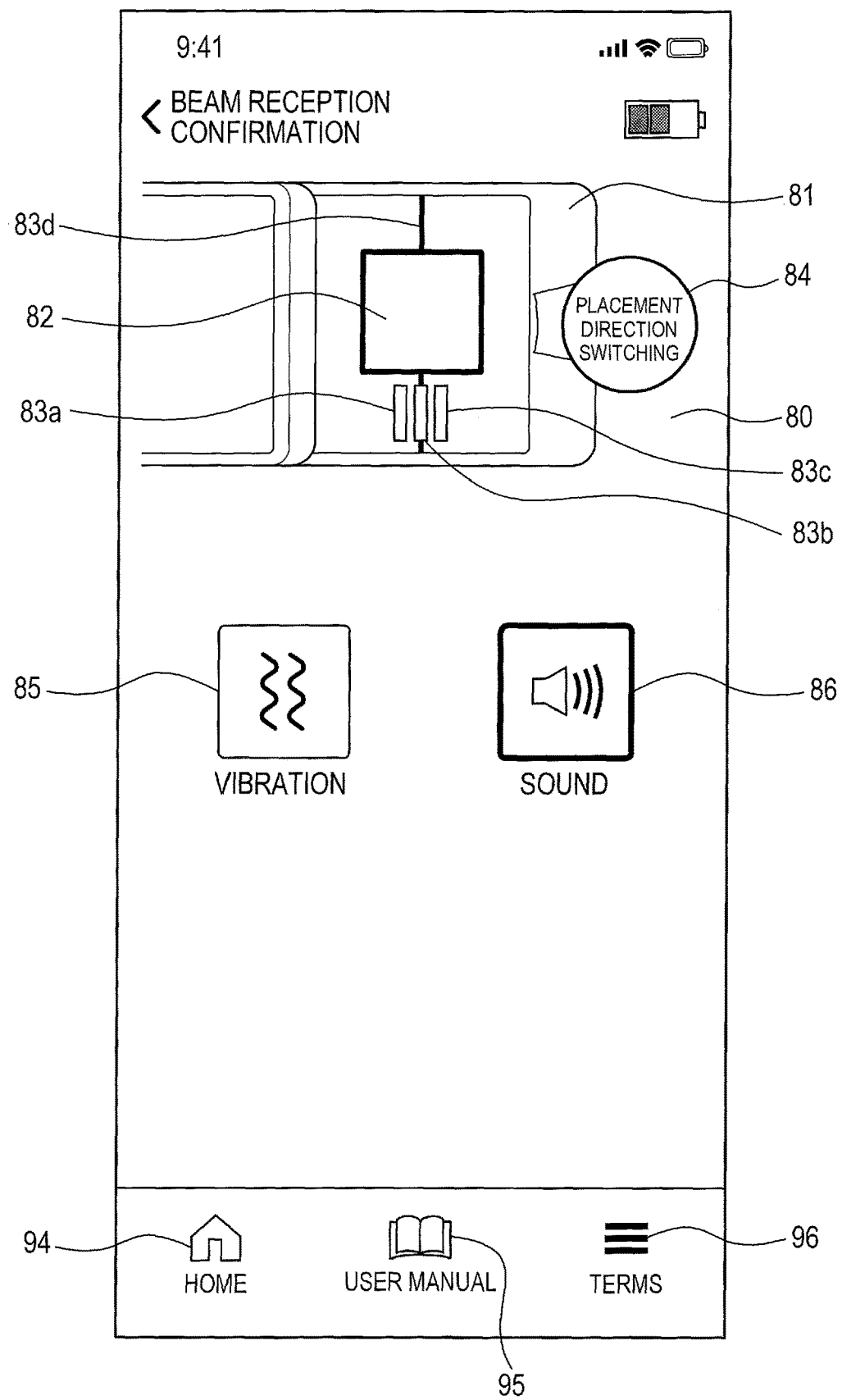
FIG. 12 is a third example of the beam reception confirmation screen of the portable terminal device.
Figure 13:
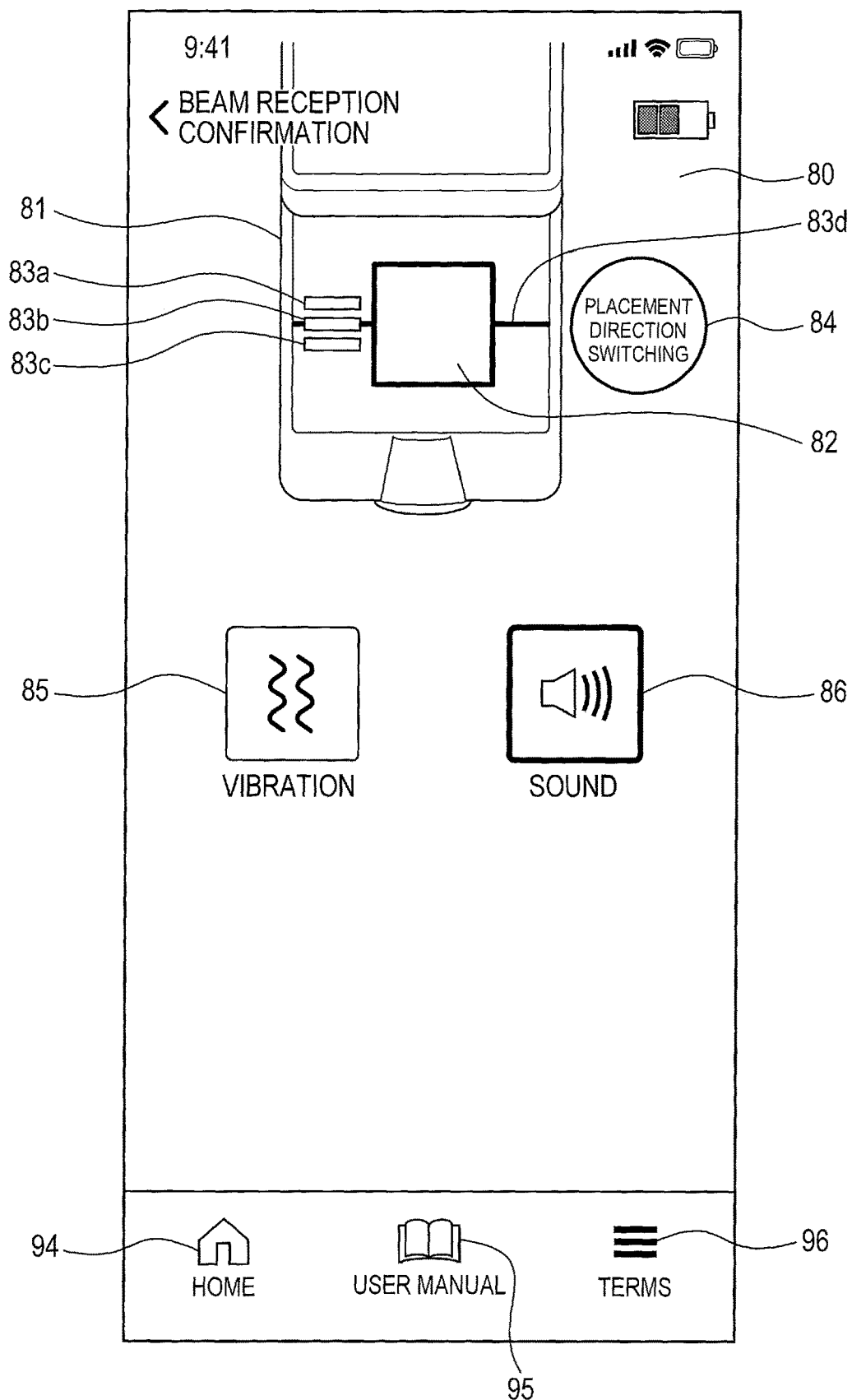
FIG. 13 is a fourth example of the beam reception confirmation screen of the portable terminal device.

FIGS. 10 to 13 show the beam reception confirmation screen. The beam reception confirmation screen includes the background image 80, the position image 81, a vibration button 85, a sound button 86, the home icon 94, the user manual icon 95, and the terms icon 96. FIG. 11 is a view obtained by rotating the position image 81 of FIG. 10 to the right by 90°. FIG. 12 is a view obtained by rotating the position image 81 of FIG. 11 to the right by 90°. FIG. 13 is a view obtained by rotating the position image 81 of FIG. 12 to the right by 90°.

The vibration button 85 is pressed by the user to provide a notification of the beam receiving position by a vibration from the vibrator 56. The terminal controller 53 makes the vibrator 56 output vibrations of different patterns in accordance with the beam receiving position.

The sound button 86 is pressed by the user to provide a notification of the beam receiving position by a buzzing sound from the speaker 58. The terminal controller 53 makes the speaker 58 output buzzing sounds of different patterns in accordance with the beam receiving position.

Returning to FIG. 4, the terminal controller 53 determines in S40 whether the placement direction switching button 84 is pressed by the user. Specifically, the terminal controller 53 determines whether a switching signal, which is outputted in response to the placement direction switching button 84 being pressed, is acquired. If the terminal controller 53 determines that the placement direction switching button 84 is pressed (S40: YES), the process proceeds to S50. In the present embodiment, the switching signal corresponds to one example of a relevant signal of the present disclosure.

In S50, the terminal controller 53 rotates the position image 81 by 90° or 180° with respect to the background image 80 and displays the rotated position image 81. The process returns to S40.

In S40, if the terminal controller 53 determines that the placement direction switching button 84 is not pressed (S40: NO), the process proceeds to S60. In S60, the terminal controller 53 performs a center alignment. Simultaneously, in S140, the device controller 31 performs a center alignment, and, in S230, the beam reception controller 61 performs a center alignment.

Specifically, the beam receiving device 60 transmits the first position signal to the laser marker 10, and the laser marker 10 transmits the second position signal to the portable terminal device 51. The terminal controller 53, based on the received second position signal, provides a notification of the beam receiving position on the position image 81. The user confirms the position image 81, and manipulates the right remote control button 92a or the left remote control button 92b. As a result, the portable terminal device 51 transmits the first or second rotation command signal to the laser marker 10. The device controller 31 outputs a motor control command in accordance with the received first or second rotation command to the motor driving circuit 35, and rotates the rotation body 12. The beam reception controller 61, the device controller 31, and the terminal controller 53 repeat this procedure until the beam receiving position matches the center position.

In S300, the terminal controller 53, the device controller 31, and the beam reception controller 61 perform an alarm process. The alarm process is performed simultaneously with the center alignment. In the present embodiment, the alarm process will be described by way of a first example and a second example.

<3-1-1. First Example of Alarm Process>

Figure 5:
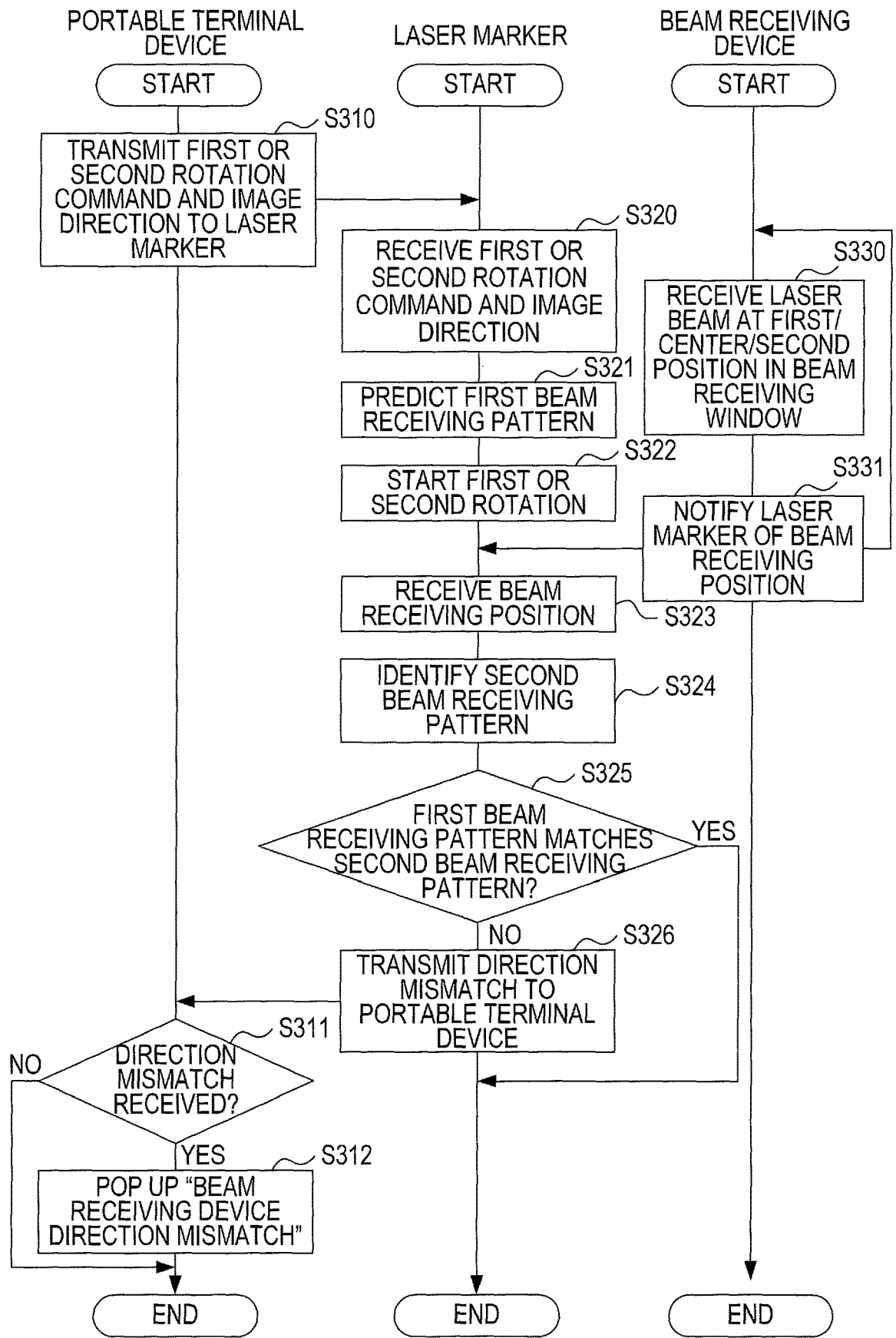
FIG. 5 is a flow chart showing further another part of the beam receiving position adjustment process.

The first example of the alarm process will be described with reference to FIG. 5. The first example corresponds to a case in which the user manipulates the rotation of the laser marker 10 in the remote controlling mode.

In S310, the terminal controller 53 transmits the first or second rotation command signal and the image direction to the laser marker 10 via the terminal communicator 59. The terminal controller 53 generates the first or second rotation command signal in response to a manipulation of the right remote control button 92a or the left remote control button 92b by the user.

In S320, the device controller 31 receives the first or second rotation command signal and the image direction via the second device communicator 21b.

In S321, the device controller 31 predicts a first beam receiving pattern in the position image 81 from the received first or second rotation command signal and image direction. The first beam receiving pattern corresponds to a transition of the beam receiving position (specifically, transition of the position at which the beam receiving position is displayed) on the position image 81 when the rotation body 12 has rotated. For example, if the image direction is a direction from right to left, and the rotation command is counterclockwise, then the beam receiving position changes in the order of the first position, the center position, and the second position. If the image direction is a direction from left to right, and the rotation command is counterclockwise, then the beam receiving position changes in the order of the second position, the center position, and the first position.

In S322, the device controller 31 generates the motor control signal corresponding to the received first or second rotation command signal, and outputs the generated motor control signal to the motor driving circuit 35. This rotates the rotation body 12 in a direction corresponding to the first or second rotation command signal, and moves the beam receiving position in the laser beam receiver 65.

On the other hand, in S330, the laser beam receiving window 88 receives the laser beam at the first position, the center position, or the second position.

In S331, the beam reception controller 61 transmits the first position signal, which corresponds to the beam receiving position in the laser beam receiving window 88, to the laser marker 10 via the device transmitter 67. The beam reception controller 61 repeatedly transmits the first position signal to the laser marker 10 until the beam receiving position matches the center position. When the beam receiving position matches the center position, the present process ends.

In S323, the device controller 31 repeatedly receives the first position signal from the beam receiving device 60 via the first device communicator 21a.

In S324, the device controller 31, based on the repeatedly receive first position signal, identifies a second beam receiving pattern. The second beam receiving pattern corresponds to a transition of the actual beam receiving position in the laser beam receiving window 88. For example, if the device direction is a direction from right to left, and the rotation command is clockwise, then the beam receiving position changes in the order of the first position, the center position, and the second position, and the repeatedly received first position signal also changes in accordance with the transition of the beam receiving position. When the device direction is a direction from left to right, and the rotation command is clockwise, then the beam receiving position changes in the order of the second position, the center position, and the first position, and the repeatedly received first position signal also changes in accordance with the transition of the beam receiving position.

In S325, the device controller 31 determines whether the first beam receiving pattern matches the second beam receiving pattern. If the image direction matches the device direction, then the first beam receiving pattern matches the second beam receiving pattern. If the image direction does not match the device direction, then the first beam receiving pattern does not match the second beam receiving pattern.

In S325, if the device controller 31 determines that the first beam receiving pattern matches the second beam receiving pattern (S325: YES), then the present process ends. If the device controller 31 determines that the first beam receiving pattern does not match the second beam receiving pattern (S325: NO), the process proceeds to S326.

In S326, the device controller 31 transmits a determination result of direction mismatch to the portable terminal device 51 via the second device communicator 21b, and the present process ends.

In S311, the terminal controller 53 determines whether the determination result of direction mismatch is received from the laser marker 10 via the terminal communicator 59. If the terminal controller 53 determines that the determination result of direction mismatch is not received (S311: NO), then the present process ends. If the terminal controller 53 determines that the determination result of direction mismatch is received (S311: YES), then the process proceeds to S312.

In S312, the terminal controller 53 provides a notification of direction mismatch. Specifically, the terminal controller 53 provides the user an alarm, and prompts the user to match the image direction to the device direction. This allows the user to be aware of the direction mismatch in a case in which the user is rotating the rotation body 12 without knowing that the image direction does not match the device direction in the remote controlling mode.

Specifically, the terminal controller 53 pops up a word "beam receiving device direction mismatch" on the rotation/tracking screen or the beam reception confirmation screen. The terminal controller 53 may provide the notification of the direction mismatch by an output of a vibration from the vibrator 56 and/or an output of a buzzing sound from the speaker 58.

<3-1-2. Second Example of Alarm Process>

Figure 6:
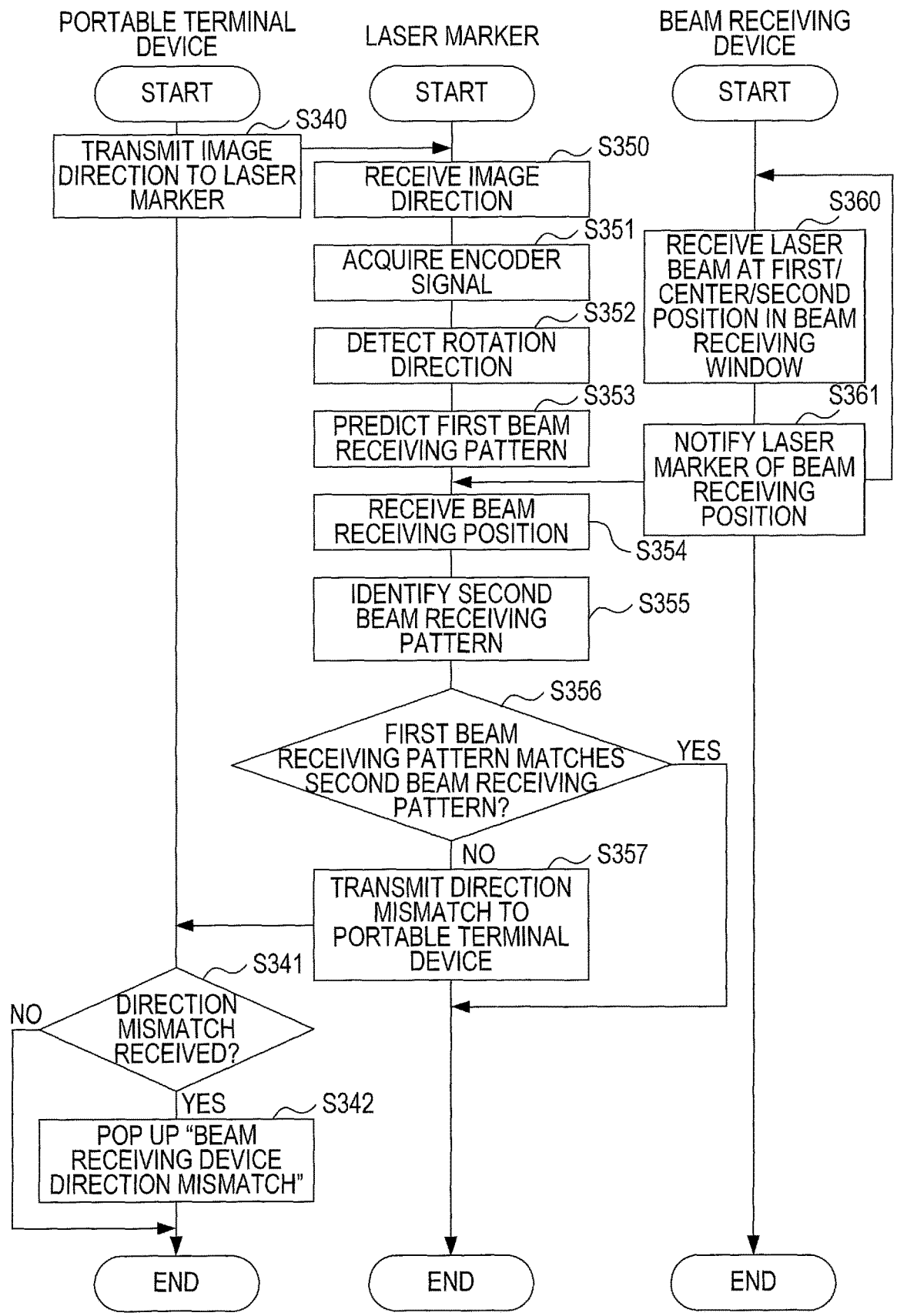
FIG. 6 is a flow chart showing further another part of the beam receiving position adjustment process.

The second example of the alarm process will be described with reference to FIG. 6. The second example corresponds to a case in which the laser marker 10 includes the encoder 38 and the user manipulates the rotation of the laser marker 10 using the fine adjustment knob 15.

In S340, the terminal controller 53 transmits the image direction to the laser marker 10 via the terminal communicator 59.

In S350, the device controller 31 receives the image direction via the second device communicator 21b.

Here, the user rotates the fine adjustment knob 15 to make a fine adjustment of the position of the rotation body 12. Specifically, the user rotates the rotation body 12 to the right or left by a small amount.

In S351, the device controller 31 repeatedly acquires the encoder signal from the encoder 38.

In S352, the device controller 31 detects the rotation direction of the rotation body 12 from time series of the acquired encoder signals.

In S353, the device controller 31 predicts the first beam receiving pattern from the received image direction and the detected rotation direction.

On the other hand, in S360 and S361, the beam reception controller 61 executes the same steps as those in S330 and S331.

In S354 to S357, the device controller 31 executes the same steps as those in S323 to S326.

In S341 and S342, the terminal controller 53 executes the same steps as those in S311 and S312.

<3-2. Automatic Adjustment Process of Image Direction>

Figure 7:
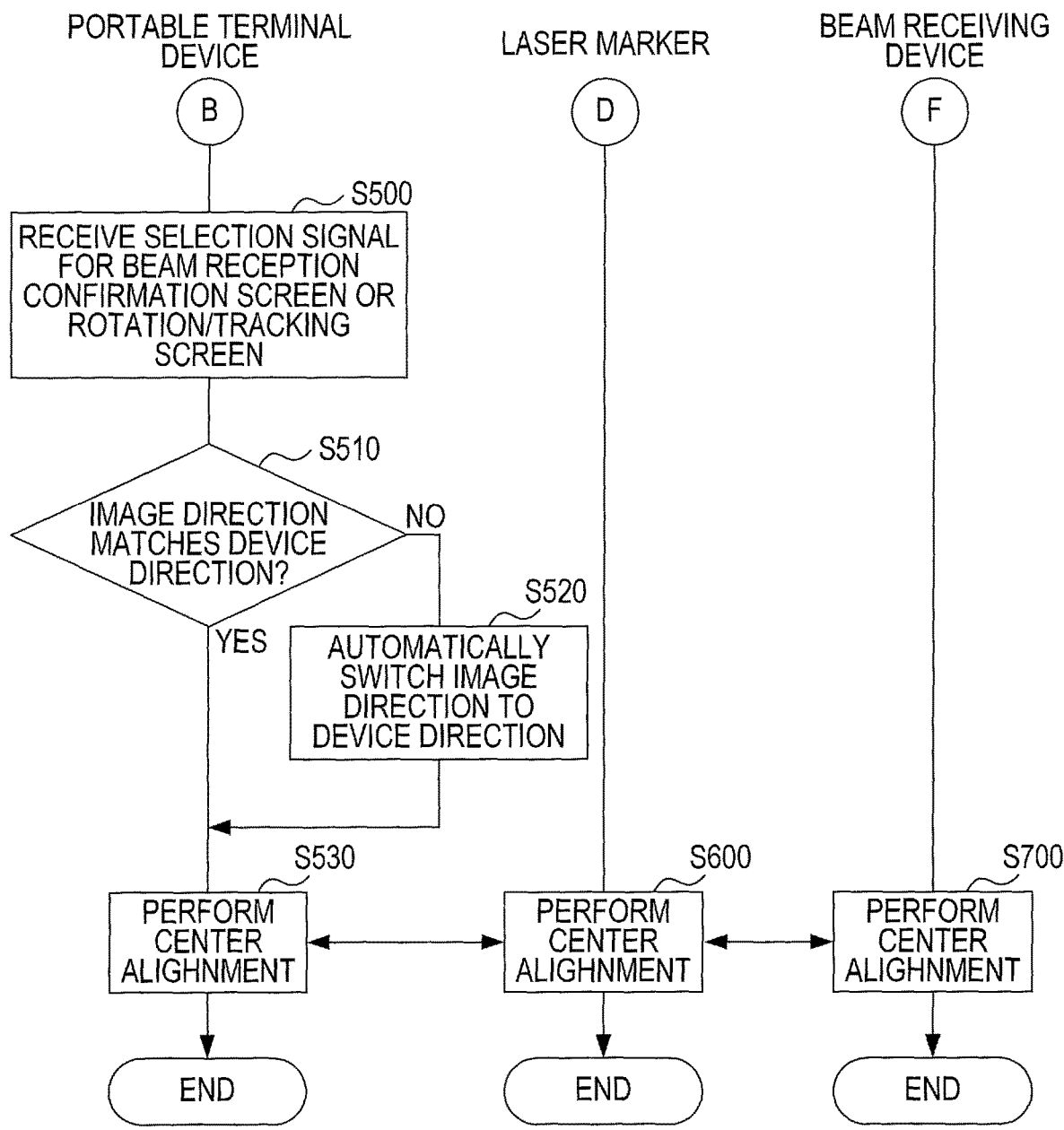
FIG. 7 is a flow chart showing a remaining part of the beam receiving position adjustment process according to the present embodiment.

In S500 to S530 shown in FIG. 7, the terminal controller 53 performs an automatic adjustment process of the image direction when the direction signal is received.

In S500, in the home screen displayed on the terminal display 57, the user selects the beam reception confirmation screen or the rotation/tracking screen, and the terminal controller 53 receives the screen selection signal. The terminal controller 53 displays the rotation/tracking screen on the terminal display 57 when the screen selection signal indicates selection of the rotation/tracking screen. The terminal controller 53 displays the beam reception confirmation screen on the terminal display 57 when the screen selection signal indicates selection of the beam reception confirmation screen.

In S510, the terminal controller 53 determines whether the image direction matches the device direction shown by the received direction signal. If the image direction matches the device direction (S510: YES), then the process proceeds to S530. If the image direction does not match the device direction (S510: NO), then the process proceeds to S520.

In S520, the terminal controller 53 automatically switches the display direction of the position image 81 so that the image direction matches the device direction. Thus, when the direction signal is received, the terminal controller 53 does not have to display the placement direction switching button 84 in the rotation/tracking screen and the beam reception confirmation screen.

In S530, S600, and S700, similar to S60, S140 and S230, the terminal controller 53, the device controller 31 and the beam reception controller 61 perform the center alignment, and the present process ends. Here, since the terminal controller 53 automatically switches the display direction of the position image 81, the alarm process is not performed.

<4. Effect>

The first embodiment described above can bring effects to be described below.

(1) The position image 81 is displayed in the specified direction with respect to the background image 80 on the terminal display 57. The portable terminal device 51, when acquiring the switching signal, or the direction signal indicating the device direction different from the image direction, rotates the position image 81 with respect to the background image 80 so that the image direction matches the device direction. Thus, when the beam receiving position of the vertical laser beam 120 is changed, a moving direction of the beam receiving position on the position image 81 matches a moving direction of the beam receiving position in the laser beam receiver 65. Accordingly, since the user can be aware of the moving direction of the beam receiving position in the laser beam receiver 65 by looking at the terminal display 57, the user can easily adjust the beam receiving position using the portable terminal device 51.

(2) When the portable terminal device 51 has not received the direction signal, the placement direction switching button 84 is displayed on the terminal display 57. The user, when being aware that the moving direction of the beam receiving position on the position image 81 differs from the moving direction of the beam receiving position in the laser beam receiver 65, can manipulate the placement direction switching button 84 to match the image direction to the device direction.

(3) When the portable terminal device 51 receives the second direction signal via the second wireless communication, the terminal controller 53, in response to the image direction differing from the device direction, can automatically rotate the position image 81 so that the image direction matches the device direction without the user's manipulation.

(4) The portable terminal device 51, when receiving the determination result of direction mismatch from the laser marker 10, provides the user an alarm to prompt rotation of the position image 81. This allows the user to be aware that the image direction differs from the device direction, and manipulate the placement direction switching button 84 to match the image direction to the device direction.

(5) The laser marker 10 uses the image direction received from the portable terminal device 51 to predict the transition of the beam receiving position on the position image 81 as the rotation body 12 rotates. When the image direction matches the device direction, the transition of the beam receiving position on the position image 81 matches the transition of the beam receiving position in the laser beam receiving window 88. Thus, when the predicted transition of the beam receiving position on the position image 81 differs from the transition of the beam receiving position received from the beam receiving device 60, the laser marker 10 can determine that the image direction differs from the device direction.

(6) The laser marker 10 can predict the transition of the beam receiving position on the position image 81 based on (i) the image direction received from the portable terminal device 51 and (ii) the first or second rotation command signal. The beam receiving position on the position image 81 changes as the rotation body 12 rotates.

(7) When the laser marker 10 includes the encoder 38, the actual rotation direction of the rotation body 12 can be detected. The laser marker 10 can predict the transition of the beam receiving position on the position image 81 based on (i) the image direction received from the portable terminal device 51 and (ii) the detected rotation direction. Specifically, even if the user manipulates the fine adjustment knob 15 and adjusts the beam receiving position, the laser marker 10 can predict the transition of the beam receiving position on the position image 81.

(8) The laser marker 10 receives the first direction signal from the beam receiving device 60, and transmits the second direction signal corresponding to the first direction signal to the portable terminal device 51. Accordingly, the portable terminal device 51 can receive the second direction signal via the laser marker 10, without direct communication with the beam receiving device 60. Further, the portable terminal device 51 can automatically rotate the image direction without the user's manipulation, so that the image direction matches the device direction without direct communication with the beam receiving device 60.

(9) The beam receiving device 60 transmits the first position signal to the laser marker 10. Thus, the laser marker 10 can acquire the transition of the beam receiving position in the laser beam receiver 65 based on the first position signal. The beam receiving position in the laser beam receiver 65 changes as the rotation body 12 rotates.

(10) When the beam receiving device 60 includes the gyro sensor 68, the beam receiving device 60 transmits the first direction signal indicating the detected device direction to the laser marker 10. Thus, the laser marker 10 can acquire the first direction signal, and transmit the second direction signal corresponding to the first direction signal to the portable terminal device 51. Further, the portable terminal device 51 can receive the second direction signal via the laser marker 10, and automatically rotate the image direction without the user's manipulation so that the image direction matches the device direction.

Other Embodiments

Although an embodiment of the present disclosure has been described above, the present disclosure is not limited to the above-described embodiment and may be practiced in various forms.
  (a) In the above-described embodiment, the terminal controller 53 executes the program that supports both the beam receiving device 60 which includes the gyro sensor 68 and the beam receiving device 60 which does not include the gyro sensor 68. The present disclosure is not limited to this. If it is known in advance that the beam receiving device 60 included in the laser marking system 1 does not include the gyro sensor 68, then the program to be installed in the terminal controller 53 may be a program that does not execute S20 and S500 to S530. Specifically, the program installed in the terminal controller 53 may be a program that executes S30 to S60 and S300, after S10. If it is known in advance that the beam receiving device 60 includes the gyro sensor 68, then the program to be installed in the terminal controller 53 may be a program that does not execute S20, S30 to S60 and S300. Specifically, the program installed in the terminal controller 53 may be a program that executes S500 to S530, after S10.
  (b) In the above-described embodiment, the terminal controller 53, when receiving the determination result of direction mismatch from the laser marker 10, pops up "direction mismatch" in S312 and S342 and prompts the user to rotate the position image 81. The present disclosure is not limited to this. The terminal controller 53, when receiving the determination result of direction mismatch from the laser marker 10, may automatically rotate the position image 81 so that the image direction matches the device direction.
  (c) Two or more functions of one element in the aforementioned embodiment may be achieved by two or more elements; or one function of one element in the aforementioned embodiment may be achieved by two or more elements. Likewise, two or more functions of two or more elements may be achieved by one element; or one function achieved by two or more elements may be achieved by one element. A part of the configuration of the aforementioned embodiment may be omitted; and at least a part of the configuration of the aforementioned embodiment may be added to or replaced with another part of the configuration of the aforementioned embodiment.

What is claimed is:

1. A method comprising:
    displaying a position image in a preset orientation on a screen of a portable terminal device, the position image including a first array of two or more position indicators, the first array corresponding to a second array of two or more beam receiving positions on a beam receiving device, each of the two or more position indicators indicating whether a corresponding one of the two or more beam receiving positions is receiving a laser beam emitted from a laser marker, the beam receiving device being placed on a job-site in association with the laser marker, the portable terminal device being spaced apart from the laser marker and the beam receiving device; and
    rotating the position image with respect to the screen so that a first orientation of the first array coincides, on the screen, with a second orientation of the second array as viewed from a user of the portable terminal device.

2. The method according to claim 1, further comprising:
    displaying an image button for the user to rotate the position image on the screen,
    wherein rotating the position image with respect to the screen so that a first orientation of the first array coincides, on the screen, with the second orientation of a second array as viewed from the user of the portable terminal device includes rotating the position image with respect to the screen in response to the user manipulating the image button.

3. The method according to claim 1, further comprising:
    receiving a first signal or a second signal with the portable terminal device, the first signal indicating that the first orientation does not coincide with the second orientation, and the second signal indicating that the first orientation coincides with the second orientation,
    wherein rotating the position image with respect to the screen so that a first orientation of the first array coincides, on the screen, with a second orientation of the second array as viewed from the user of the portable terminal device includes rotating the position image with respect to the screen in response to the portable terminal device having received first signal.

4. The method according to claim 1, further comprising:
    receiving sensor information with the portable terminal device, the sensor information indicating whether the beam receiving device includes an orientation sensor configured to detect the second orientation;
    displaying an image button for the user to rotate the position image on the screen based on the sensor information received indicating that the beam receiving device does not include the orientation sensor; and
    receiving a first signal or a second signal with the portable terminal device based on the sensor information received indicating that the beam receiving device includes the orientation sensor, the first signal indicating that the first orientation does not coincide with the second orientation, and the second signal indicating that the first orientation coincides with the second orientation,
    wherein rotating the position image with respect to the screen so that a first orientation of the first array coincides, on the screen, with a second orientation of the second array as viewed from the user of the portable terminal device includes rotating the position image with respect to the screen in response to (i) the user manipulating the image button or (ii) the portable terminal device having received of the first signal.

5. The method according to claim 2, wherein the laser marker is configured to (i) acquire information relating to the first orientation and the second orientation and (ii) determine whether the first orientation coincides with the second orientation, and
    wherein the method further comprising:
        transmitting a signal indicating the first orientation to the laser marker from the portable terminal device;
        receiving a determination result from the laser marker; and providing an alarm based on the determination result received indicating that the first orientation does not coincides with the second orientation.

6. A laser marker comprising:
a support body;
a rotation body (i) on top of the support body and (ii) rotatable with respect to the support body;
a motor configured to rotate the rotation body;
a laser beam emitter provided to the rotation body and configured to emit a laser beam;
a device communicator configured (i) to perform a first wireless communication with a beam receiving device and (ii) to perform a second wireless communication with a portable terminal device, the beam receiving device being placed on a job-site in association with the laser marker, the portable terminal device (i) being spaced apart from the laser marker and the beam receiving device, (ii) including a screen, and (iii) being configured to display a position image in a preset orientation on the screen, the position image including a first array of two or more position indicators, the first array corresponding to a second array of two or more beam receiving positions on the beam receiving device, each of the two or more position indicators indicating that a corresponding one of the two or more beam receiving positions is receiving the laser beam;
a first device reception circuit configured to, during rotation of the rotation body, sequentially receive two or more position signals of the beam receiving device by the first wireless communication via the device communicator, the two or more position signals respectively corresponding to the two or more beam receiving positions;
a second device reception circuit configured to receive a first orientation signal from the portable terminal device by the second wireless communication via the device communicator, the first orientation signal indicating a first orientation of the first array;
a prediction circuit configured to predict a first sequence based on the first orientation signal received by the second device reception circuit, the first sequence specifying an order in which the two or more position signals are received by the first device reception circuit;
a determination circuit configured to determine that the first orientation differs from the second orientation in response to the first sequence predicted by the prediction circuit does not coincide with a second sequence, the second sequence specifying an order in which the two or more position signals have been received by the first device reception circuit; and
a first device transmission circuit configured to transmit a determination result by the determination circuit to the portable terminal device by the second wireless communication via the device communicator.

7. The laser marker according to claim 6, further comprising:
a third device reception circuit configured to receive a rotation command from the portable terminal device by the second wireless communication via the device communicator, the rotation command commanding a rotation direction of the rotation body; and
a motor driving circuit configured to drive the motor based on the rotation command received by the third device reception circuit,
wherein the prediction circuit is configured to predict the first sequence based on (i) the first orientation signal received by the second device reception circuit and (ii) the rotation command received by the third device reception circuit.

8. The laser marker according to claim 6, further comprising:
a rotation direction sensor configured to detect a rotation direction of the rotation body,
wherein the prediction circuit is configured to predict the first sequence based on (i) the first orientation signal received by the second device reception circuit and (ii) the rotation direction detected by the rotation direction sensor.

9. A laser marker comprising:
a support body;
a rotation body (i) on top of the support body and (ii) rotatable with respect to the support body;
a motor configured to rotate the rotation body;
a laser beam emitter (i) in the rotation body and (ii) configured to emit a laser beam;
a device communicator configured (i) to perform a first wireless communication with a beam receiving device and (ii) to perform a second wireless communication with a portable terminal device, the beam receiving device being placed on a job-site in association with the laser marker, the portable terminal device (i) being spaced apart from the laser marker and the beam receiving device, (ii) including a screen, and (iii) being configured to display a position image in a preset orientation on the screen, the position image including a first array of two or more position indicators, the first array corresponding to a second array of two or more beam receiving positions on the beam receiving device, each of the two or more position indicators indicating whether a corresponding one of the two or more beam receiving positions is receiving the laser beam;
a device reception circuit configured to receive a first signal or a second signal from the beam receiving device by the first wireless communication via the device communicator, the first signal indicating that a first orientation of the first array does not coincide with a second orientation of the second array, and the second signal indicating that the first orientation coincides with the second orientation; and
a device transmission circuit configured to transmit the first signal or the second signal received by the device reception circuit to the portable terminal device by the second wireless communication via the device communicator.

10. A beam receiving device comprising:
a device communicator configured to perform the first wireless communication with the laser marker according to claim 9;
a device orientation sensor configured to detect the second orientation; and
an orientation transmission circuit configured to transmit the first signal or the second signal to the laser marker by the first wireless communication via the device communicator, based on the second orientation detected by the device orientation sensor.

* * * * *